US012592226B1

(12) United States Patent
Dhrif

(10) Patent No.: US 12,592,226 B1
(45) Date of Patent: Mar. 31, 2026

(54) NATURAL LANGUAGE PROCESSING SKILL CANDIDATE DETERMINATION

(71) Applicant: Amazon Technologies, Inc., Seattle, WA (US)

(72) Inventor: Hassen Dhrif, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 542 days.

(21) Appl. No.: 17/844,268

(22) Filed: Jun. 20, 2022

(51) Int. Cl.
*G10L 15/18* (2013.01)
*G10L 15/14* (2006.01)
*G10L 15/22* (2006.01)

(52) U.S. Cl.
CPC .......... *G10L 15/1815* (2013.01); *G10L 15/14* (2013.01); *G10L 15/22* (2013.01); *G10L 2015/223* (2013.01)

(58) Field of Classification Search
CPC ..... G10L 15/1815; G10L 15/14; G10L 15/22; G10L 2015/223; G10L 15/18
See application file for complete search history.

(56) References Cited

U.S. PATENT DOCUMENTS

| | | | |
|---|---|---|---|
| 11,301,540 B1 * | 4/2022 | Boteanu | G06F 40/279 |
| 2021/0327413 A1 * | 10/2021 | Suwandy | G06N 3/045 |
| 2023/0376700 A1 * | 11/2023 | Bista | H04L 51/02 |

* cited by examiner

*Primary Examiner* — Angela A Armstrong
(74) *Attorney, Agent, or Firm* — K&L Gates LLP

(57) ABSTRACT

Devices and techniques are generally described for natural language processing interfaces. In various examples, first natural language data may be received from an input device. First embedding data representing the first natural language data may be generated. A nearest neighbor algorithm may determine first data representing similarity between the first embedding data and second embedding data, the second embedding data representing second natural language data associated with a first skill. The nearest neighbor algorithm may determine second data representing similarity between the first embedding data and third embedding data, the third embedding data representing third natural language data associated with a second skill. First output data that indicates that the first skill and the second skill are candidates for processing the first natural language data may be generated.

18 Claims, 7 Drawing Sheets

Natural language Processing System 220

Text-to-Speech Component 280

Skills 290

110

Storage 270

Natural Language Processing Component 240

ASR Component 250

NLU Component 260

Orchestrator 230

Natural Language Processing-Enabled Device 111

Local Natural language Processing Component 240'

Local ASR Component 250'

Local NLU Component 260'

Local TTS Synthesis Component 280'

Skills Execution Component 644

Output Device 610

Voice Services Component 626

Speech Comm Libr 636

Hybrid Request Selector 632

LRO 642

Hybrid Exec Cntlr 638

Hybrid Proxy 634

Speech Interaction Manager 628

App 630

110

Audio Front End 625

Wakeword Engine 624

Communications Interface 612

Microphone(s) 470

Audio Data 211

FIG. 6

NATURAL LANGUAGE PROCESSING SKILL CANDIDATE DETERMINATION

BACKGROUND

Automatic speech recognition (ASR) combined with language processing techniques may enable a computing device to retrieve and process commands from a user based on the user's spoken commands. In some systems, speech recognition and/or voice-controlled devices activate upon detection of a spoken "wakeword." Natural language processing is used to translate the spoken requests into semantic interpretations of the spoken command. A speech processing application (e.g., a "skill") is selected for processing the spoken request. Executable instructions are generated based on the semantic interpretation of the spoken command. The executable instructions are executed by the skill and a corresponding task is performed. Such speech processing and voice control may be used by personal computers, hand-held devices, telephone computer systems, and a wide variety of other computing devices to improve human-computer interactions and to control various systems.

BRIEF DESCRIPTION OF DRAWINGS

FIG. 6 is a block diagram illustrating a natural language processing-enabled device and a natural language processing management system, in accordance with embodiments of the present disclosure.

DETAILED DESCRIPTION

Figure 1:
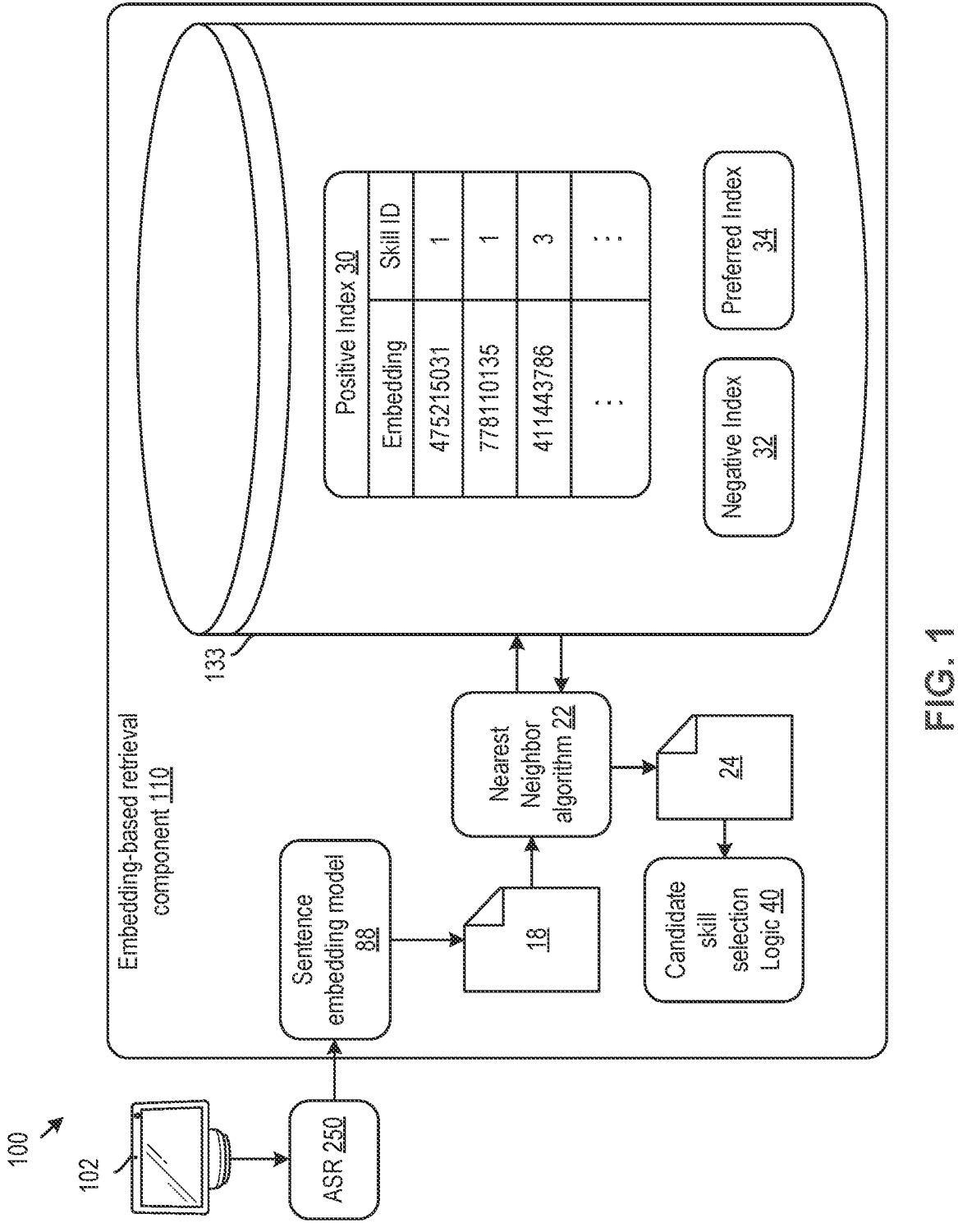
FIG. 1 is a block diagram illustrating an example embedding-based retrieval component, according to various aspects of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Devices with integrated processing capabilities are often configured with network communication capability and/or other computing functions allowing the devices to send data to and/or receive data from other devices. In some examples, such devices may include voice-enabled personal assistants and/or other natural language processing interfaces that may be used to control the devices, answer questions, commu-nicate with other people/devices, and/or otherwise interact with the devices and/or other devices. As such devices become more and more prevalent in both the home, office, public spaces, quasi-public spaces (e.g., hotels, offices, retail spaces), and elsewhere generally, and as the technology matures, new services and features are being developed. For instance, in some cases devices may be paired or otherwise grouped together with one another to enable certain functionality. For example, a device that includes voice-based personal assistant functionality may be paired with a device including a display so that spoken commands may be used to control content output by the display device. In another example, content may be transferred from one device to another device in response to user requests and/or other triggering events (e.g., If This Then That (IFTTT) recipes, presence information, etc.).

Applications (e.g., skills configured to work with a natural understanding user interface) may be selected to process a given natural language request. For example, a music skill may be used in response to a request to playback particular songs, albums, artists, musical genres, etc. Each skill may be associated with its own functionality. Some skills may playback content such as the aforementioned music skill and/or a video skill. Other skills may provide answers to user questions, may be used to control devices (e.g., self-driving robots, thermostats, security systems, cameras, etc.), may be used to make purchases (e.g., ordering food, taxis, goods/services from online store, etc.), and/or perform a myriad of other actions. A large number of skills may be implemented to respond to and/or otherwise process user inputs. For example, many natural language processing systems may offer application program interfaces (APIs) whereby other pieces of software, such as skills can be routed data and commands from the natural language processing system. As the number of available skills continues to grow, selection of a particular skill for a given natural language input by a natural language processing system is increasingly a non-trivial task. Described herein is, among other things, an embedding-based system that can be configured to retrieve a subset of candidate skills for processing a given natural language input from among all available skills. The subset of candidate skills (and/or data representing how appropriate these candidate skills are for processing the current input) may be used by other, downstream routing systems of the natural language processing system to select a skill for processing the natural language component.

Since there are so many natural language processing skills available (with more being developed), it is increasingly challenging to select a single skill or set of skills to process a given natural language input. This is particularly helpful when a user does not identify a particular skill by name in their request. For example, a user may speak the request, "Alexa, order pizza." There may be multiple skills from different pizza makers, including local restaurants as well as brands carried by food/online stores that can be delivered. Additionally, many skills may be effective to process an "order" intent to order goods or services (whether pizza or not). As such, it may be difficult to select a single skill to process the user's request, since the user has not invoked a single skill by name. Additionally, while skill developers may provide sample utterances and interactions that define particular user interaction patterns with their skills, it is difficult to predict all the different ways in which a user may phrase their requests. For example, a skill interaction model may include the sample utterances "I need towels in my room." However, users may say "get towels," "towels are missing," "send towels," etc. It may be difficult for a natural language processing system to determine that such requests are also appropriate to be handled by the same skill due to the different phrasing.

In various examples described herein, an embedding-based retrieval system is used to find a semantic similarity between the input natural language request and sample utterances associated with skills. Different indices may be generated that include samples of positive utterances (e.g., utterances that the skill has been designed to handle and which can successfully be processed by the skill), negative utterances (e.g., utterances that should not be processed by the skill and/or to which the skill is unable to respond), and/or preferred utterances (e.g., target utterances that are of particular relevance to the skill and which should result in skill invocation). As used herein, skill invocation refers to selection of a skill for processing natural language input data.

The various systems and techniques described herein determine the utterances represented in such indices that have the highest semantic similarity to the input natural language request. Since each of these utterances are associated in the indices with a particular skill, a subset of the skills that are most likely to be able to successfully process the input request are determined. Various pre-filtering logic may be applied to limit the search space to skills associated with the input request. For example, if the natural language input is received by a device registered to a particular hotel chain, the list of skills may be filtered such that only the skills associated with the hotel chain are considered, or such that the skills associated with the hotel chain are preferred over other skills. Similarly, there may be contextual data available indicating that the particular user prefers a particular skill over another skill. This contextual data may be used to filter the search space and/or search results to the preferred skills. Additionally, pruning logic may be used to determine which skills and/or similarity scores should be passed on for further routing processing, as described in further detail below. In general, a higher similarity score may represent a greater degree of similarity between the embedding data being compared relative to a lower similarity score.

Automatic speech recognition (ASR) is a field of computer science, artificial intelligence, and linguistics concerned with transforming audio data associated with speech into text data and/or other ASR output data representative of that speech. Natural language understanding (NLU) is a field of computer science, artificial intelligence, and linguistics concerned with enabling computers to derive meaning from text input containing natural language, resulting in specific executable command data or other type of instructions. As described in further detail below, in some examples, NLU processing may include multiple different processes that may be executed for a given natural language input in order to determine a semantic interpretation of the natural language input. Natural language generation (NLG) is a computer-based process that may be used to produce natural language output. Text-to-speech (TTS) is a field of computer science, artificial intelligence, and linguistics concerned with enabling computers to output synthesized speech. ASR, NLU, NLG, and TTS may be used together as part of a natural language interface system. As used in, natural language input data may comprise audio data (e.g., representing a user request or command), text data, and/or other representation data representing natural language for input into a natural language processing system.

As used herein, user utterances, input text data, and/or any form of data input to a natural language processing system ("input data") may be described by "request data" and/or "user request data." Such request data may change forms many times during processing of the request data by various components of the natural language processing system. For example, initially the request data may be audio data and/or input text data representing a user question. The audio data may be transformed into text data and/or other ASR output data by an ASR component of the speech processing system. The text data and/or other ASR output data may be transformed into intent data by an NLU component of the speech processing system. The intent data may be used by a speech processing application (e.g., a skill) to perform an action (e.g., to generate action data (e.g., computer-executable commands) that may be processed in order to take some corresponding action such as answering a user's question, playing video, playing audio, etc.). "Request data" and/or "user request data" may refer to any data related to an input request to a speech processing system (e.g., including the various data forms described above, as each of the aforementioned data types relate to an input request to the speech processing system). In general, as used herein, natural language processing "applications" may be any software (and/or combination of software and hardware) used during natural language processing to take an action in response to input request data (e.g., natural language inputs such as user utterances and/or text). Such applications may include speech processing skills and/or other types of speech processing software.

The various techniques described herein may be used in a variety of contexts, including in natural language processing enabled devices (e.g., devices employing voice control and/or speech processing "voice assistants") and/or systems. Examples of speech processing systems and/or voice-enabled personal assistants include the Siri system from Apple Inc. of Cupertino, California, voice-enabled actions invoked by the Google Assistant system from Google LLC of Mountain View, California, Dragon speech recognition software or the Cortana system from Microsoft of Redmond, Washington, the Alexa system from Amazon.com, Inc. of Seattle, Washington, etc. Other examples of smart home devices and/or systems that may use the various content-based voice targeting techniques described herein may include Google Nest Smarthome products from Google LLC, HomeKit devices from Apple Inc., various smart doorbells (e.g., with integrated cameras and/or natural language processing capability), etc. For example, some models of Ring camera-integrated doorbells include Alexa speech processing functionality to allow users to have a virtual assistant interact with people at the door to take messages, etc.

Natural language processing enabled devices may include one or more microphones (e.g., far-field microphone arrays) used to transform audio into electrical signals. Speech processing may then be performed, either locally by the speech processing enabled device, by one or more other computing devices communicating with the speech processing enabled device over a network, or by some combination of the natural language processing enabled device and the one or more other computing devices. In various examples, natural language processing enabled devices may include and/or may be configured in communication with speakers and/or displays effective to output information obtained in response to a user's spoken request or command, and/or to output content that may be of interest to one or more users.

Storage and/or use of data related to a particular person or device (e.g., device identifier data, device names, names of device groups, contextual data, and/or any personal data) may be controlled by a user using privacy controls associated with a speech processing enabled device and/or a companion application associated with a speech processing enabled device. Users may opt out of storage of personal, device state (e.g., a paused playback state, etc.), and/or contextual data and/or may select particular types of personal, device state, and/or contextual data that may be stored while preventing aggregation and storage of other types of personal, device state, and/or contextual data. Additionally, aggregation, storage, and use of personal, device state, and/or contextual information, as described herein, may be compliant with privacy controls, even if not legally subject to them. For example, personal, contextual, device state, and other data described herein may be treated as if it was subject to acts and regulations, such as the Health Insurance Portability and Accountability Act (HIPAA) and the General Data Protection Regulation (GDPR), even if it is not actually subject to these acts and regulations. In various examples, the device and/or device group names and/or any data captured by such devices may be used only in accordance with user permission, in compliance with any relevant laws and/or policies. Additionally, users may opt out of data collection, and/or may opt to delete some or all of the data used by the various techniques described herein, even where deletion or non-collection of various data may result in reduced functionality and/or performance of various aspects of the systems described herein.

In various examples, a natural language processing enabled device may include a wakeword detection component. The wakeword detection component may process audio data captured by microphones of the speech processing enabled device and may determine whether or not a keyword and/or phrase, which are collectively sometimes referred to herein as a "wakeword", is detected in the audio data. In some examples, when a wakeword is detected, the speech processing enabled device may enter a "sending mode," "audio capturing mode," and/or other type of processing mode in which audio detected by the microphones following the wakeword (e.g., data representing user request data spoken after the wakeword) may be sent to natural language processing computing component(s) (either locally or remotely) for further natural language processing (e.g., ASR, NLU, etc.). In various examples, the wakeword detection component may be used to distinguish between audio that is intended for the natural language processing system and audio that is not intended for the natural language processing system.

In various examples, skills may determine an action to take for processing particular request data according to an interpretation of the natural language input (represented by the request data), as determined by NLU. For example, a particular skill may be selected to process request data based on a determination that the request data refers to the particular skill by name. In another example, a skill may evaluate its ability to process request data based on one or more intents and/or named entities determined during NLU processing of the request data. In another example, a natural language processing system may determine a skill that may generate a response to request data that may be output via a TTS component of the speech processing system.

The natural language processing routing architecture may facilitate the routing of request data to the appropriate skills and/or other speech processing components. In various examples, the natural language processing routing architecture may use machine learning models trained using features computed using user feedback data, contextual data, can fulfill intent request (CFIR) tags, and/or other signals in order to determine the appropriate natural language processing application and/or other speech processing component to process request data. In various examples, using machine learning models to dynamically learn routing may improve the accuracy of the routing of natural language processing requests, resulting in improved user experiences and/or more pertinent responses to request data. For example, a machine learning system may dynamically learn from contextual data and/or user feedback data to provide routing exceptions and/or routing flexibility, in contrast to a deterministic routing system.

In various examples, in order to narrow down a list of skills for consideration for processing a given request an embedding-based retrieval system, described herein, may be used to select a subset of candidate skills to be considered by downstream routing components. As described in further detail below, the embedding-based retrieval system may be used to determine semantic similarity between the current natural language input and utterances that have been registered as appropriate and/or actionable utterances for specific skills (which often times may not include a name of the skill or other identifying data tending to identify the skill). In addition, the embedding-based retrieval system may consider "negative" utterances, which are those utterances that should not trigger selection of the skill and/or utterances to which the skill is unable to respond. Both negative and positive utterances may be registered by the skill developer during the registration process. Similarly, in some examples, preferred utterances (e.g., target utterances) may be provided that represent utterances that have strong associations with a skill. The embedding-based retrieval system generates similarity scores between the natural language input and the various positive, negative, and preferred registered utterances and uses configurable logic to determine a subset of candidate skills for further downstream routing processing.

FIG. 1 is a block diagram illustrating an example system 100 comprising an embedding-based retrieval component 110, according to various aspects of the present disclosure. In various examples, a natural language processing-enabled device 102 may be effective to receive spoken requests and/or other natural language requests (e.g., text) (e.g., via one or more microphones) and may process the received input using ASR component 250. ASR component 250 may be executed locally by the natural language processing-enabled device 102, remotely by a natural language processing system 220, and/or by some combination of the two. The ASR component 250 may generate ASR output data (e.g., text) that may represent a transcription of a spoken user request. In examples where the natural language input is received as text, ASR component 250 may be by-passed.

The ASR output data (and/or the user-input text, depending on the form of the natural language input) may be received by the embedding-based retrieval component 110 and may be input into a sentence embedding model 88. In various examples, the sentence embedding model 88 may be implemented as a machine learning model that may be trained to generate data representing a semantic interpretation of the natural language input (e.g., at the sentence level as opposed to at the word/token level). In various examples, the sentence embedding model 88 may be implemented as a pre-trained Bidirectional Encoder Representations from Transformers (BERT) model may be used to generate the embedding data representing the natural language input. However, other instantiations may instead be used. For example, a long short-term memory (LSTM) model, another transformer and/or attention-based model, etc., may be used. In general, the sentence embedding model may generate embedding data 18 that may be a representation of the entire natural language input including of the relationships and/or positions of the various words in the input as well as their meanings.

A skill interaction model may be data describing the ways in which a user may interact with a skill in order to have the skill perform various actions. For example, for a given skill, the skill interaction model may define a list of actionable utterances that a user may use (sometimes referred to herein as "positive utterances"). Utterances refer to sentences and phrases (whether spoken or written) that may be associated with a given skill. A positive utterance from a skill interaction model may include one or more slots. For example, the skill may be a travel agent skill that may book flights and/or accommodations for a user. The skill interaction model for the skill may include a first positive utterance, "book me a flight to {Slot_A}." Additionally, for the utterance, the skill interaction model may provide a list of valid slot values. In the foregoing example, the list may be a list of destination cities that are compatible with the skill and/or travel booking service. In order to populate a list of utterances associated with travel booking skill (hereinafter Skill 1), each valid slot value may be sampled to generate a number of permuted positive utterances, "book me a flight to Denver," "book me a flight to Seattle," etc.

In some cases, utterances of a skill interaction model may be aggregated to reduce the overall consideration set for a search index (e.g., positive index 30). For example, the skill interaction model for Skill 1 may list an utterance "book me a flight from {Slot_A} to {Slot_B}" with a list of departing cities and destination cities for each of the two slots. As described previously, permuted positive utterances may be generated by sampling from the valid slot values for Slot_A. Accordingly, if there are 10 valid values (departing cities) for Slot_A, 10 permuted utterances may be generated. However, to limit the overall number of permutations, the embeddings for the utterances in Slot_B may be averaged to generate an average slot embedding. Accordingly, to aggregate the embeddings for an utterance with two slots, a first slot may be permutated among valid slot values while the second slot may be represented by an average embedding among valid slot values. Similarly, the first slot may be represented by an average embedding value while the second slot may be permuted.

The sample positive utterances (those utterances for which the skill is able to provide an appropriate response) for a given skill interaction model may be embedded using the sentence embedding model 88 and may be used to populate a positive index 30. As shown, each embedding is associated with skill identifier data identifying the particular skill to which the utterance embedding pertains.

In addition, the embedding-based retrieval component 110 may generate other indices, such as negative index 32 and/or preferred index 34. The negative index 32 may be populated with utterance embeddings representing utterances that should not be used to invoke a particular skill and/or utterances to which the skill is unable to respond. For example, a taxi service may have a positive utterance "order me a car" and a negative utterance "buy a car." For example, although the phrase "buy a car" may be semantically similar to "order me a car," the taxi skill developer may not want user utterance requesting car purchases to be routed to the taxi skill. Preferred index 34 may store target utterances that are particularly appropriate for a given skill. Indices 133 refers to the various indices (including positive index 30, negative index 32, preferred index 34, and/or any other desired search sets) that may be searched using the nearest neighbor algorithm 22 to determine a similarity between the natural language input and natural language data represented in one of the indices.

During runtime, after generating embedding data 18 representing the natural language input, the nearest neighbor algorithm 22 (e.g., KNN, approximate nearest neighbors, etc.) may be used to determine, for each index, the embeddings that are the most similar, in the embedding space to the embedding data 18 representing the natural language input. Depending on the particular nearest neighbor algorithm 22 (or other dense vector search algorithm) being used, the similarity metric may vary. For example, cosine similarity, Euclidean distance, etc., may be used to determine the most similar embedding stored in each index. In various examples, if a similarity score (e.g., cosine similarity, inverse Euclidean distance, etc.) exceeds a tunable threshold similarity score, an index utterance may be returned as a hit. For example, if the similarity score generated by the nearest neighbor algorithm for the embedding data 18 and the embedding 778110135 (FIG. 1) is returned as 0.8 and the threshold similarity score is 0.6, Skill ID 1 may be returned from the positive index 30. In some examples, the similarity score (0.8 in this example) may also be returned. The nearest neighbor algorithm 22 may return the top k most similar results (e.g., the most similar embedding data) from each index, where k is a tunable parameter of the nearest neighbor algorithm. Each of these results may be compared to the threshold similarity score and if the similarity score meets and/or exceeds the threshold the result may be determined to be a hit. The Skill ID of such hits and/or the similarity score associated with the particular Skill ID and its embedding data may be output as data 24. Candidate skill selection logic 40 may process the data 24 to determine a set of candidate skills for further natural language processing routing by the natural language processing routing architecture (as described in further detail below in reference to FIG. 2).

Candidate skill selection logic 40 may be programmable logic that may be used to determine whether a returned skill among data 24 should be included in a set of skill for further routing processing. For example, Skill A may be returned in data 24 with a similarity score of 1.4 for a particular entry of the positive index 30. Additionally, Skill A may be returned in data 24 with a similarity score of 1.5 for a particular entry of the negative index 32. Candidate skill selection logic 40 may comprise instructions indicating that if a similarity score for a negative index result is higher than a similarity score of a positive index result, for the same skill, the skill should not be included in the output set of skills for further routing processing.

In another example, candidate skill selection logic 40 may comprise instructions indicating that if there is preferred index result associated with a particular skill where the similarity score is above a threshold score the preferred index result should take priority over positive results. In another example, candidate skill selection logic 40 may comprise instructions indicating that if there is preferred index result that is not associated with a particular skill, where the similarity score is above a threshold score, all positive results with similarity scores less than the similarity score for the preferred index result should be ignored. So, for example, if Skill A has a positive index similarity score of 1.7, Skill B has a positive index similarity score of 1.9, and Skill C has a positive index similarity score of 1.4, and a non-skill-specific preferred index result has a similarity score of 1.6, the Skill C result should be pruned from the list of results for further routing processing. It should be noted, that similarity scores being "above" a threshold are just one example of "satisfying" the threshold. In some other examples, being "below" the threshold may satisfy it, depending on the implementation and depending on whether high similarity scores or low similarity scores indicate a higher degree of similarity between the data being compared.

Accordingly, for a given natural language input, three concurrent queries are executed on the three indices (positive index 30, negative index 32, and preferred index 34). The search results from the three indices are combined to improve performance. In an example of the candidate skill selection logic 40, the results from the positive and negative indices may first be compared. Any skills returned only from the positive index may be kept. For intersecting skills that include at least one positive result and at least one negative result, if the negative index similarity score is greater than the positive index similarity score, then the skill is removed from the search results.

Take for example the input utterance "bring me towels," where the search results from the positive index 30 includes two skills-"Amenities Skill" and "Guest Services Skill" with scores of 1.8 and 1.5 respectively—and the negative index results contain the results for two skills-"Guest Services Skill" and "Vacation Countdown Skill" with scores of 1.6 and 1.5, respectively. When comparing the intersecting skill from the two indices (Guest Services Skill), the negative index score is higher (e.g., the negative index score For the Guest Services Skill is 1.6 while the positive index score is 1.5), so the Guest Services Skill is removed from the list of proposed skills. Therefore, from comparing these two indices, it is the Amenities Skill that is output for further routing processing.

In another example of candidate skill selection logic, the union of the preferred index 34 results and the output between the arbitrated positive and negative indices is determined, and the scores of intersecting skills are replaced with the max scores between the two. If in the previous example, the preferred index 34 returns the Amenities Skill with a similarity score of 1.9, then that score may be used instead of the 1.8 similarity score result from the positive index 30. In this example, the final output includes the Amenities Skill (e.g., data identifying the Amenities Skill) with a similarity score of 1.9. Given that the preferred index includes high value use cases (e.g., utterances) for skill developers, the preferred index's output may be favored over the negative index output. Accordingly, if there are highly-scored hits for a skill in both the negative and the preferred indices, the skill may be included in the output list.

Figure 2:
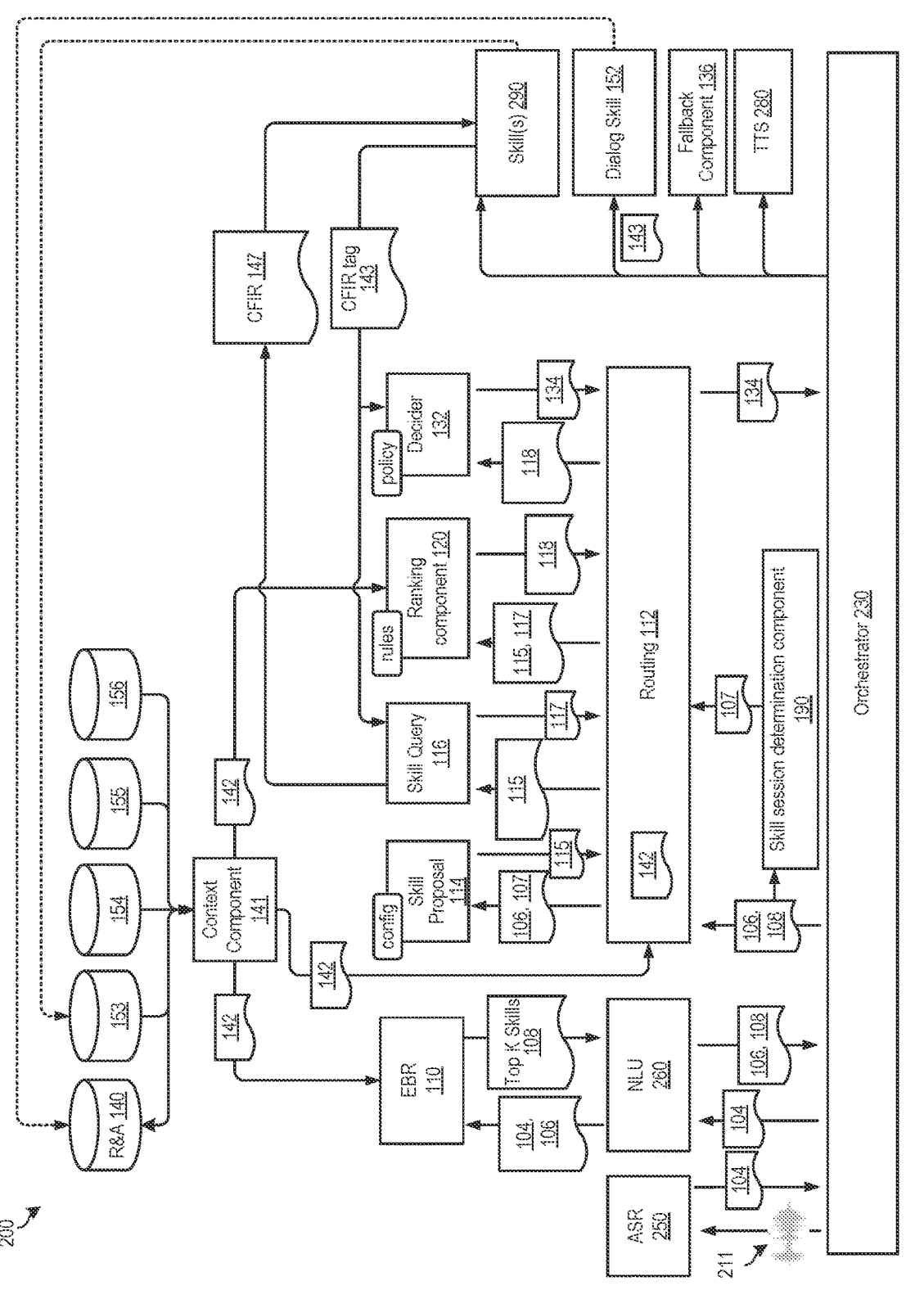
FIG. 2 is a block diagram illustrating an example natural language processing routing architecture, according to various embodiments of the present disclosure.

FIG. 2 is a block diagram illustrating an example natural language processing system 200, according to various embodiments of the present disclosure. In various examples below, skills may be referred to, however the techniques described herein with respect to skills are applicable to any natural language processing applications. A system according to the present disclosure may operate using various components as described in FIG. 2. The various components illustrated FIG. 2 may be located on the same or different physical devices. Communication between various components illustrated in FIG. 2 may occur directly or across a network. A speech processing-enabled device may capture audio using an audio capture component, such as one or more microphone(s). The speech processing enabled device may send audio data 211 (e.g., corresponding to request data) to an orchestrator 230 of the natural language processing system 200. The speech processing enabled device may also send metadata (e.g., including device identifiers, device type data, contextual data, IP address data, room location data, etc.) to the orchestrator 230. The components depicted in FIG. 2, including components of a speech processing system may be generally referred to as spoken language processing components, a natural language processing system 200 a spoken language processing system, speech processing components, and/or a speech processing routing system. Additionally, in various examples, the components depicted in FIG. 2 may process written input (e.g., text data) in addition to spoken input.

Upon receipt by the natural language processing system 200, the audio data 211 may be sent to an orchestrator 230. The orchestrator 230 may include memory and logic that enables the orchestrator 230 to initiate a dialog session and to transmit various pieces and forms of data to various components of the system, as described in further detail below.

The orchestrator 230 may send the audio data 211 to an ASR component 250 (e.g., a speech recognition component). The ASR component 250 may transcribe the audio data 211 into one or more hypotheses representing speech contained in the audio data 211. The ASR component 250 interprets the speech in the audio data based on a similarity between the characteristics of the audio data corresponding to the speech and pre-established language models. For example, the ASR component 250 may compare the audio data 211 with models for sounds (e.g., subword units such as phonemes) and sequences of sounds to identify words that match the sequence of sounds in the speech represented in the audio data 211. The ASR component 250 may send text data and/or other ASR output data 104 generated thereby to orchestrator 230 that may, in turn, send the text data (and/or other ASR output data 104) to NLU component 260. As previously described, the text data and/or other ASR output data 104 may include one or more ASR hypotheses. The text data and/or other ASR output data 104 may include a top scoring hypothesis of the speech represented in the audio data 211 or may include an N-best list including a group of hypotheses of the speech represented in the audio data 211, and potentially respective scores ASR processing confidence scores. As previously described, in some other examples, the ASR component 250 (and/or other components of the natural language processing system 200) may generate other metadata associated with the request such as an overall utterance confidence score, per-word (e.g., per token) confidence scores for the utterance, utterance duration, stream duration (e.g., duration of the stream of audio data from speech processing enabled device to natural language processing system 200), a number of tokens output by ASR, etc.

The NLU component 260 attempts to make a semantic interpretation of the phrases or statements represented in the text data (and/or other ASR output data) input therein. That is, the NLU component 260 determines one or more meanings associated with the phrases or statements represented in the text data and/or other ASR output data 104 based on individual words represented in the text data (and/or other ASR output data 104). The NLU component 260 interprets a text string to derive an intent of the user (e.g., an action that the user desires be performed) as well as pertinent pieces of information in the text data (and/or other ASR output data) that allow a device (e.g., the speech processing enabled device, the natural language processing system 200, a computing device(s) implementing a speech processing application, etc.) to complete the intent. For example, if the text data and/or other ASR output data 104 corresponds to "Set temperature to 74 degrees," the NLU component 260 may determine the user intended to invoke a climate intent with a target temperature value slot of 74 degrees Fahrenheit. As previously described, in addition to the NLU intent and slot data, the NLU component 260 may generate other metadata associated with the request (e.g., with the audio data 211). Examples of such metadata include, an NLU confidence score for the top intent hypothesis, NLU classification type (e.g., statistical vs. deterministic), NLU slot presence (e.g., data indicating that a particular slot was present), NLU confidence score for the overall top hypothesis (e.g., including the relevant speech processing application, intent, and/or slot), entity recognition confidence scores, entity recognition match types (e.g., exact match, prefix match, suffix match, etc.), etc. Herein, the data output by the NLU component 260 (depicted in FIG. 2 as "NLU 260") is referred to as NLU output data 106.

In various examples, the NLU component 260 may include the sentence embedding model 88 of FIG. 1. However, in other implementations, the sentence embedding model 88 may be conceptually separate from NLU component 260. In any event, the sentence embedding model 88 may generate embedding data representing the ASR output data 104 at the sentence level (e.g., by considering each word of the input utterance and each word's relationship to each other word). Accordingly, NLU output data 106 may include the embedding data generated by the sentence embedding model 88.

NLU component 260 may send the text data (and/or other ASR output data 104) and/or some of NLU output data 106 (such as intents, recognized entity names, slot values, etc.) to an embedding-based retrieval component 110. As described above, the embedding-based retrieval component 110 may determine a similarity between the embedding data representing the natural language input and embedding data stored in various indices that are associated with different skills (e.g., in positive index 30, negative index 32, and/or preferred index 34).

The embedding-based retrieval component 110 may request contextual data 142 from the context component 141 and the context component 141 may send contextual data 142 to embedding-based retrieval component 110. In various examples described herein, the contextual data 142 may include a list of preferred skills associated with the request, user account data, device identifier data, and/or data indicating that a particular agent that has been invoked (e.g., with a speech processing agent that is associated with the request). In various examples, the embedding-based retrieval component 110 may ingest this contextual data 142 as input (e.g., input features) and may generate the list of candidate skills for processing the current input request data based at least in part on the contextual data 142. For example, if the device from which the input utterance was received is associated with a particular set of skills, a pre-filtering operation may be performed so that the embedding-based retrieval component 110 considers only those skills when using the nearest neighbor algorithm 22 to search the indices 133 (FIG. 1). Pre-filtering may be performed by sending instructions to the nearest neighbor algorithm 22 that are effective to limit consideration of entries of the indices 133 to those entries that correspond to the skills associated with the input device and/or account. Similarly, a particular agent mentioned in the natural language input may be used to pre-filter the set of skills queried in the indices 133.

As previously described, the embedding-based retrieval component 110 may generate similarity scores for each of the candidate skills indicating a similarity between the natural language input and an utterance that is stored in one of the indices 133 in association with the particular skill. The similarity scores may be sent to the ranking component 120 and used as input to machine learned models of the ranking component 120 in order to rank candidate data (e.g., <interpretation, skill, skill session, agent>hypotheses) for processing the input request data.

Embedding-based retrieval component 110 may send the top K skills 108 to NLU component 260. NLU component 260 may thereafter perform skill-specific NLU processing for the skills in the top K skills 108 to determine skill-specific intents, slots, and/or named entities. NLU output data 106 may include such skill-specific data (e.g., skill-specific N-best hypotheses). In addition, NLU component 260 may determine interpretations of the input request data (e.g., the ASR output data 104 that are for other skills apart from the top K skills 108 output by the embedding-based retrieval component 110. In some examples, generating pre-computed features based on user feedback data by ranking and arbitration component 140 may generate increasingly contextually rich feature data that may be used to train various machine learning models used to route speech processing request data (e.g., ranking component 120, embedding-based retrieval component 110, etc.).

Ranking and arbitration component 140 may communicate with various systems in order to obtain source data used to precompute features. In an example embodiment, ranking and arbitration component 140 may receive source data used to precompute features that is generated by other speech processing components (e.g., NLU component 260, ASR component 250, etc.). For example, NLU intent data may be used to pre-compute features for some downstream speech processing component (e.g., ranking component 120). Ranking component 120 may be "downstream" in the sense that processing by NLU component 260 occurs prior to processing by ranking component 120 during a given dialog session. In another example, ranking and arbitration component 140 may communicate with feedback storage 153 to receive user feedback data (e.g., explicit and/or implicit user feedback related to user satisfaction with processing of one or more request data) used as source data to precompute features. In various examples, the user feedback data may be user-specific and/or device specific and may indicate whether a user was satisfied or not satisfied with a particular interaction with natural language processing system 200. Additionally, ranking and arbitration component 140 may communicate with endpoint context system 154, which may provide context data at the conclusion of a user interaction with the natural language processing system 200. In another example, ranking and arbitration component 140 may communicate with speech processing application data 156 to determine information from the speech processing application regarding past interactions with the speech processing application and/or data acquired by the speech processing application. Additionally, ranking and arbitration component 140 may communicate with other data sources 155, as new services are added and/or as new data types that may be useful for routing prediction are made available. In addition to ranking and arbitration component 140 using contextual data 142 to precompute features used by various machine learning models of the routing architecture of the natural language processing system 200, a context component 141 may receive the contextual data 142. The context component 141 may provide the context data directly to both ranking and arbitration component 140 as well as to various components of the routing architecture of natural language processing system 200. For example, the context component 141 may send contextual data 142 to embedding-based retrieval component 110 and/or ranking component 120 in order to determine a shortlist of skills 290 for particular request data and/or in order to rank the shortlisted speech processing applications.

NLU output data 106 (e.g., intent data comprising semantic interpretations of the input request data) and top K skills 108 may be sent by NLU component 260 to orchestrator 230. Orchestrator 230 may send the top K skills 108 and the NLU output data 106 to routing component 112. Routing component 112 may query context component 141 using one or more of the device ID, entity ID, and/or deviceType ID received as part of the input request data. In response, the context component 141 may send contextual data 142 to routing component 112. In addition, embedding-based retrieval component 110 may receive the slot data 180 (included in NLU output data 106) as well as the device state data 196, as described above in reference to FIG. 1 and may select one or more skill sessions 107 on which to act for the input request. The selected skill session 107 may be sent from embedding-based retrieval component 110 to routing component 112.

Routing component 112 may send the top K skills 108, the selected skill session 107, and NLU output data 106 to skill proposal component 114. Skills 290 may subscribe to particular intents using skill proposal component 114. Accordingly, skill proposal component 114 may receive the NLU output data 106 and may determine whether any of the included intents correspond to one or more of skills 290 that have registered for the particular intent. If so, skill proposal component 114 may generate candidate data 115 comprising <interpretation, skill, skill session, agent>candidate quads. The candidate data 115 may be sent to routing component 112.

The hypothesis data comprising the candidate data 115 may be sent by routing component 112 to skill query service 116. Skill query service 116 comprises an API through which skills 290 may "opt out" of particular requests. For example, a skill 290 may comprise a video playback skill. Accordingly, the skill 290 may register with skill query service 116 to indicate that only requests made on a device with a display screen should be routed to the particular skill 290. In addition, skills 290 may communicate availability information, pricing information, and/or other structured descriptions of how and under what circumstances (e.g., determined using context data) the skill 290 can fulfill a request included in the current request data.

Skill query service 116 provides a capability for speech processing applications (e.g., skills) to provide signals to ranking component 120 that indicate how well the particular speech processing application may handle the current request data. For example, skill query service 116 may send a "Can fulfill intent request" (CFIR) 147 to candidate skills (e.g., top K skills 108 output by embedding-based retrieval component 110). CFIR 147 may include intent data and/or slot data (e.g., the interpretation of the input request) from the NLU output data 106. Each of the candidate skills may respond to the CFIR 147 with CFIR response data indicating whether the skills are able to process the current request data. Additionally, one or more of the candidate skills may respond to the CFIR 147 with CFIR tag 143, which may be metadata indicating an action and/or type of action that the particular candidate skill will perform if the request data is routed to the particular candidate skill for processing.

As previously described, the various candidate skills may evaluate an ability to fulfill a current request based on a determination as to whether the skill is effective to process the intent data and/or recognize the slot data that is provided with the CFIR 147. Additionally, the skill may include a CFIR tag 143 with the response data that indicates a particular action that the skill would take if the skill is ultimately selected for processing the current request. For example, the CFIR tag 143 may be metadata indicating that the skill is able to process the intent successfully. In another example, the CFIR tag 143 may indicate that the skill intends to engage the user in a dialog in response to being selected to process the current request. In another example, the CFIR tag 143 may indicate that the skill intends to initiate streaming of video and/or audio (e.g., initiate video playback and/or audio playback) in response to being selected to process the current request. In another example, the CFIR tag 143 may indicate that the skill intends to render a spoken response (e.g., audio data output by a TTS component) to the user in response to being selected to process the current request.

In various examples, skill query service 116 may generate a signal 117 representing the CFIR tag 143 and/or the candidate skills' responses to eligible skill capability data (which may be provided as part of contextual data 142). If the skill action represented by the CFIR tag 143 does not correspond to the skill capability, the hypothesis including the relevant candidate data 115 may be filtered out (e.g., excluded from further routing decisions). Conversely, if the CFIR tag 143 represented by signal 117 indicates an action that corresponds to the skill capability data the relevant hypothesis candidate data 115 may be sent to ranking component 120.

The ranking component 120 may query context component 141 for contextual data 142 using one or more of the device ID, entity ID, and/or deviceType ID received as part of the input request data. The contextual data 142 sent to the ranking component 120 may include device context data and/or request context data. The ranking component 120 may use such contextual data 142 during ranking of the hypothesis data represented by the candidate data 115. Skill query service 116 may send a signal 117 indicating what skills can fulfill a particular request (and/or what skills are unable to fulfill the request), and/or how well the skill is able to fulfill the request. The signal 117 may be sent to routing component 112. Routing component 112 may send the signal 117 along with the candidate data 115 to a ranking component 120. In various examples, CFIR tag 143 may indicate situations in which a skill may opt out of processing a particular request (e.g., if the device sending the request data does not include a display screen, etc.). Accordingly, in at least some examples, CFIR 147 may include context data, such as a device ID, to indicate the context of the speech processing enabled device from which the request data was received.

Ranking component 120 may include one or more statistical machine learning models effective to rank the candidates included in candidate data 115. In order to rank the candidate data 115, ranking component 120 may generate confidence scores for each corresponding candidate data 115. As previously described, the ranking component 120 may receive the confidence scores generated by embedding-based retrieval component 110 and may use such scores as an input signal to rank the hypothesis data comprising the candidate data 115. A confidence score output by ranking component 120 may indicate that the corresponding skill 290 and/or intent of the candidate pair is appropriate to process the request. Ranking component 120 may compute features using the candidate data 115, the contextual data 142, and signal 117 (representing CFIR tag 143 and/or skill responses to CFIR 147) in order to predict the ranking of the skills 290 included in the candidate data 115. The features computing during processing of the request data (sometimes referred to as "runtime features") may comprise a feature representation of the list of candidate data 115 and/or a representation of the signal 117. Additionally, ranking component 120 may query ranking and arbitration component 140 for precomputed features that have been defined for use by ranking component 120. As previously described, the precomputed features may be determined based on contextual data, user feedback data, past usage data, skill data, previous rankings of ranking component 120, etc.

Ranking component 120 may generate a ranked list 118 of the candidate skills indicated in candidate data 115. In at least some examples, the ranking component 120 may use a deep neural network as a machine learning model for determining the ranked list 118. Inputs to the machine learning models of the ranking component 120 may include NLU output data 106, signal 117 (comprising CFIR tag 143), contextual data 142, candidate data 115, data representing enabled skills (e.g., for the speech processing enabled device and/or account that received the input request data/utterance), NLU confidence data, ASR confidence data, etc.

In various examples, a decider component 132 may receive the ranked list 118 of candidates (including any candidates selected via a dynamic routing adjustment, as described above). In some examples, the decider component 132 may act as a check on the results of the ranking component. For example, there may be scenarios in which statistical models of the ranking component 120 may determine that a request should be routed to a particular skill to perform a particular action. However, there may be risks associated with performance of the action or with routing the request data to the skill for processing. For example, a user may say the phrase "turn on the oven." The ranking component may determine that the top-ranked result is a control skill that is effective to process the request data to turn on the oven. However, contextual data 142 may indicate that the user is not currently at home. Accordingly, turning on the oven may currently be unsafe, and the statistical result of the ranking component 120 may not be a safe or an intended result according to a particular policy. The policy may be a set of deterministic rules used to provide safety boundaries on sensitive requests.

Accordingly, the decider component 132 may compare the results of the ranking component 120 to one or more predefined policies that may indicate whether or not request data should be sent to top-ranked result of the ranking component 120 or whether some other action should be taken. For example, if the phrase "Arm the security system" is interpreted by ASR/NLU as the current utterance, the decider component may comprise a policy indicating that the ranking component results should be ignored and that the utterance should always be passed to a security system skill used to control security system hardware.

In another example, a decider component may determine a class of the utterance. For example, if the utterance is classified as belonging to a sensitive class the speech processing system may use a dialogue speech processing application and/or TTS to confirm the user's intention prior to routing the request data to the top-ranked result of the ranker component. For example, request data may be a request to "unlock the front door." The top-ranked result of the ranking component may be routing to a skill that controls the lock on the front door. However, requests to unlock doors may be classified by the decider component 132 as a sensitive request. Accordingly, the receipt of the sensitive request may trigger a confirmation request output by TTS prior to routing the request data to the top-ranked skill. For example, the confirmation request may be "Did you want me to unlock the front door?" Decider component 132 may output plan data that comprises a routing plan 134 for processing the request data. The routing plan 134 may define a target skill 290 to process the request data as well as a target skill section (from candidate data 115) on which to act. As described above, the target skill 290 may be selected as the top-ranked hypothesis determined by the ranking component 120. In some other examples, the decider component 132 may select a target skill 290 based on a policy and/or based on a class of the request data, as described above. In many examples, the skill session to be acted upon may be the skill session output by embedding-based retrieval component 110. However, in some cases, a different skill session may be selected by the ranking component 120 based on the various other inputs. In some examples, the ranking component 120 may determine that two different skills and/or two different skill sessions are equally applicable for processing the request data. In such examples, the decider component 132 may determine that disambiguation should occur. Accordingly, the routing plan 134 may include sending the request data to a dialog skill 152 that may output (via TTS) one or more questions (e.g., a disambiguation request) used to prompt the user to disambiguate between the two equally likely (or approximately equally likely) interpretations of the request data. For example, it may be unclear, based on a user's request, whether the user intended to invoke a movie playback skill or a music playback skill, as a movie and a soundtrack for the movie may be identified using the same name. Accordingly, the decider component 132 may determine that the top two hypotheses of ranking component 120 are equally likely (or approximately equally likely) and may determine that a question should be asked to disambiguate between the two possible actions. Accordingly, the routing plan 134 may route the request data to the dialog skill 152, and the dialog skill 152 may inquire whether the user intended to play the movie or the soundtrack.

In another example, the decider component 132 may determine that the user was not satisfied with the top hypothesis of the ranking component 120 (e.g., due to explicit or implicit feedback received from the user in response to taking an action associated with the top ranking component 120 hypothesis). Accordingly, the decider component 132 may determine that the routing plan 134 should be to determine the second highest ranked hypothesis of the ranking component 120. The routing plan 134 may be sent to the fallback component 136. In various examples, the fallback component 136 may determine a list of the top hypotheses, top intents, and/or top ASR text interpretations from the previous turn of dialog, and may select a fallback option for processing the request data from the lists.

The natural language processing system 200 may also include a TTS component 280 that synthesizes speech (e.g., generates audio data) corresponding to text data input therein. Accordingly, one or more of skills 290, dialog skill 152, fallback component 136, ASR component 250, and/or orchestrator 230. The TTS component 280 may perform speech synthesis using one or more different methods. In one method of synthesis called unit selection, the TTS component 280 matches text data against one or more databases of recorded speech. Matching units are selected and concatenated together to form audio data. In another method of synthesis called parametric synthesis, the TTS component 280 varies parameters such as frequency, volume, and noise to create an artificial speech waveform output. Parametric synthesis uses a computerized voice generator, sometimes called a vocoder.

Figure 3:
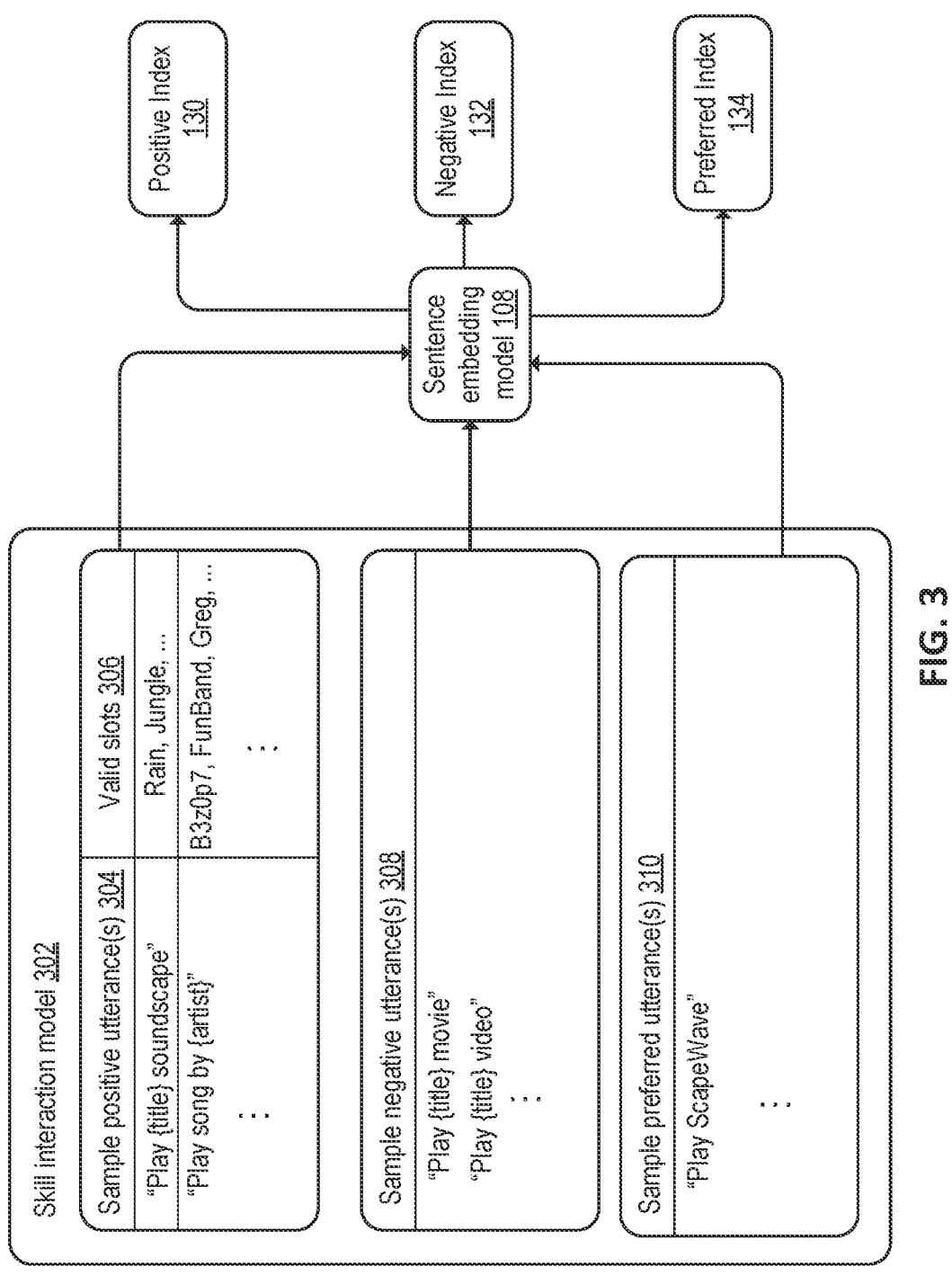
FIG. 3 depict an example of populating search indices using a skill interaction model, in accordance with various aspects of the present disclosure.

FIG. 3 depict an example of populating search indices using a skill interaction model, in accordance with various aspects of the present disclosure. As shown in FIG. 3, a skill interaction model 302 may be used to determine various sample utterances and/or slot values associated with a particular skill. In the example of FIG. 3, the skill interaction model 302 may pertain to a soundscape skill for playing soundscapes and/or songs. In some examples, the skill interaction model 302 may include various sample positive utterance(s) 304, sample negative utterance(s) 308, and/or sample preferred utterance(s) 310. Although, in some cases, sample negative utterance(s) 308 and/or sample preferred utterance(s) 310 may be omitted.

The sample positive utterance(s) 304 may include utterances that the particular skill is designed to handle and process in order to perform the functionality of the skill (in the current case, music and/or sound playback). The first sample utterance of skill interaction model 302 is "Play {title} soundscape" and includes the slot {title}. Valid slots 306 provide a list of valid entities for the slot {title}. In this case, these entities include "rain" and "jungle." Accordingly, a valid utterance that may invoke the skill's intended functionality may be "Play jungle soundscape." Similarly, the skill interaction model 302 includes the sample positive utterance 304: "Play song by {artist}" with the valid slots 306 being a list of entities (e.g., artists) including "B3z0p7," "FunBand," and "Greg."

For sample positive utterances 304 with a single slot (such as those shown in FIG. 3), permutations of the utterance may be generated for each valid slot value. For example, for the sample positive utterance "Play {title} soundscape" the permutations "Play Rain soundscape" and "Play Jungle soundscape" may be generated. Each of these permuted sample positive utterances may be input into the sentence embedding model 88 and the resulting embedding data may be stored in the positive index 30 together with metadata identifying the skill to which the skill interaction model 302 pertains (e.g., a skill ID). As previously described, for sample utterances with two (or more) slots, one slot may be permuted with valid entity values while the average embedding for the remaining slot may be used to reduce the search space.

The skill developer may not want the skill to be recommended for processing utterances related to video or movie playback. Accordingly, in the skill interaction model 302, the skill developer may list sample negative utterances 308. These utterances will be embedded using the sentence embedding model 88 and stored in negative index 32 to ensure that these utterances do not result in the skill being invoked. In some examples, in addition to skill-specific negative utterances, the negative index 32 may also include out of domain utterances and/or profane language to avoid routing to any particular skill (where there may be a hit in the positive index 30) if there is a strong similarity to the profanity included in the negative index 32.

Sample preferred utterance(s) 310 may be those utterances that are of particular importance to the skill. For example, utterances that include a name of the skill, a nickname of the skill, a permutation of a name of the skill, and/or which particularly relate to the skill from among other skills (e.g., in terms of the service and/or request). In the example of FIG. 3 "Scapewave" may be a nickname of the skill. "Play ScapeWave" may be embedded and stored in the preferred index 34.

In some cases, there may be a first set of indices 133 for skills developed by entities that also developed the natural language processing system 220. In some cases, the utterances in such indices may not be specific to a particular skill but may be generally applicable to a variety of first party skills. A separate set of indices 133 may be used for skills developed by other entities. This may help to ensure consistent performance for first party skills that may be generally applicable to natural language processing functionality (as opposed to related to specific services).

Figure 4:
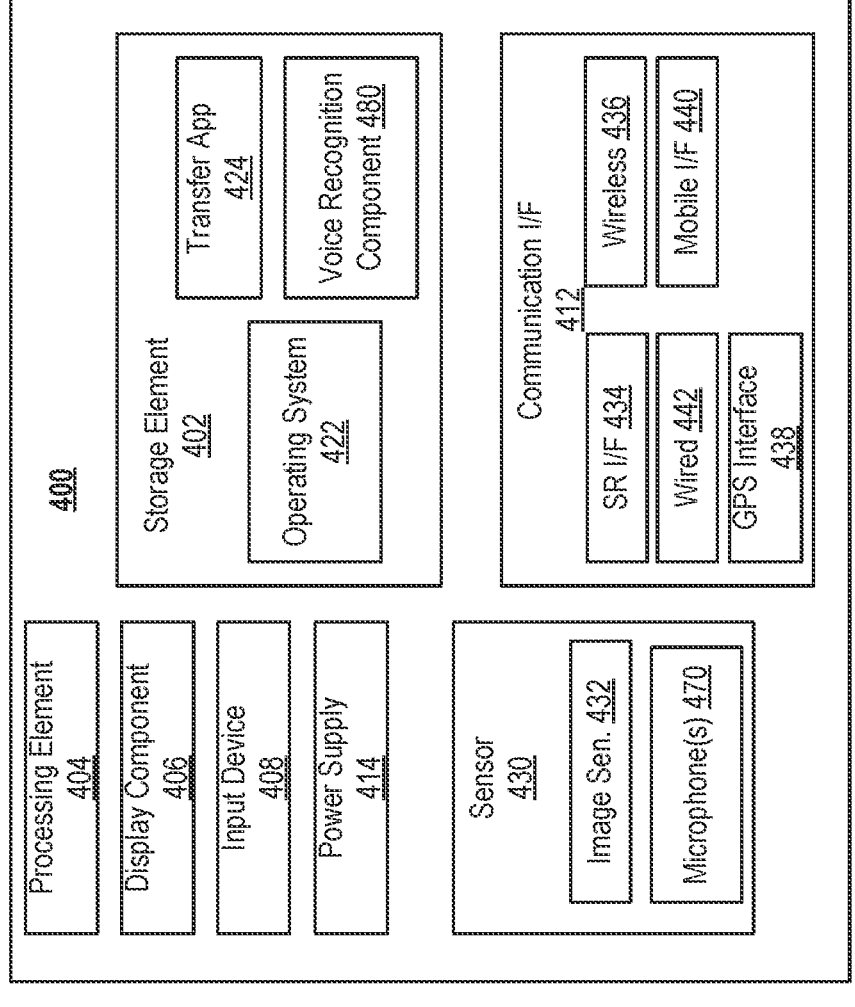
FIG. 4 is a block diagram showing an example architecture of a network-connected device that may be used in accordance with various embodiments described herein.

FIG. 4 is a block diagram showing an example architecture 400 of a network-connected device (e.g., a local network-connected device) that may be used to implement, at least in part, a natural language processing-enable device configured to receive spoken and/or other natural input commands, in accordance with various aspects of the present disclosure. It will be appreciated that not all devices will include all of the components of the architecture 400 and some user devices may include additional components not shown in the architecture 400. The architecture 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). In some examples, the processing element 404 may be effective to determine a wakeword and/or to stream audio data to a speech processing system. The storage element 402 can include one or more different types of memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc. In various examples, the storage element 402 may comprise embedding-based retrieval component 110 and/or other components of natural language processing system 200.

The storage element 402 may also store software for execution by the processing element 404. An operating system 422 may provide the user with an interface for operating the computing device and may facilitate communications and commands between applications executing on the architecture 400 and various hardware thereof. A transfer application 424 may be configured to receive images, audio, and/or video from another device (e.g., a mobile device, image capture device, and/or display device) or from an image sensor 432 and/or microphone 470 included in the architecture 400. In some examples, the transfer application 424 may also be configured to send the received voice requests to one or more voice recognition servers.

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 406 may be effective to display content determined provided by a skill executed by the processing element 404 and/or by another computing device.

The architecture 400 may also include one or more input devices 408 operable to receive inputs from a user. The input devices 408 can include, for example, a push button, touch pad, touch screen, wheel, joystick, keyboard, mouse, track-ball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 or an array of microphones for capturing sounds, such as voice requests. Voice recognition component 480 may interpret audio signals of sound captured by microphone 470. In some examples, voice recognition component 480 may listen for a "wakeword" to be received by microphone 470. Upon receipt of the wakeword, voice recognition component 480 may stream audio to a voice recognition server for analysis, such as a speech processing system. In various examples, voice recognition component 480 may stream audio to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other computing devices. For example, the communication interface 412 may comprise a wireless communication module 436 configured to communicate on a network, such as a computer communication network, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication module 442 may be configured to communicate according to the USB protocol or any other suitable protocol.

The architecture 400 may also include one or more sensors 430 such as, for example, one or more position sensors, image sensors, and/or motion sensors. An image sensor 432 is shown in FIG. 4. An example of an image sensor 432 may be a camera configured to capture color information, image geometry information, and/or ambient light information.

Figure 5:
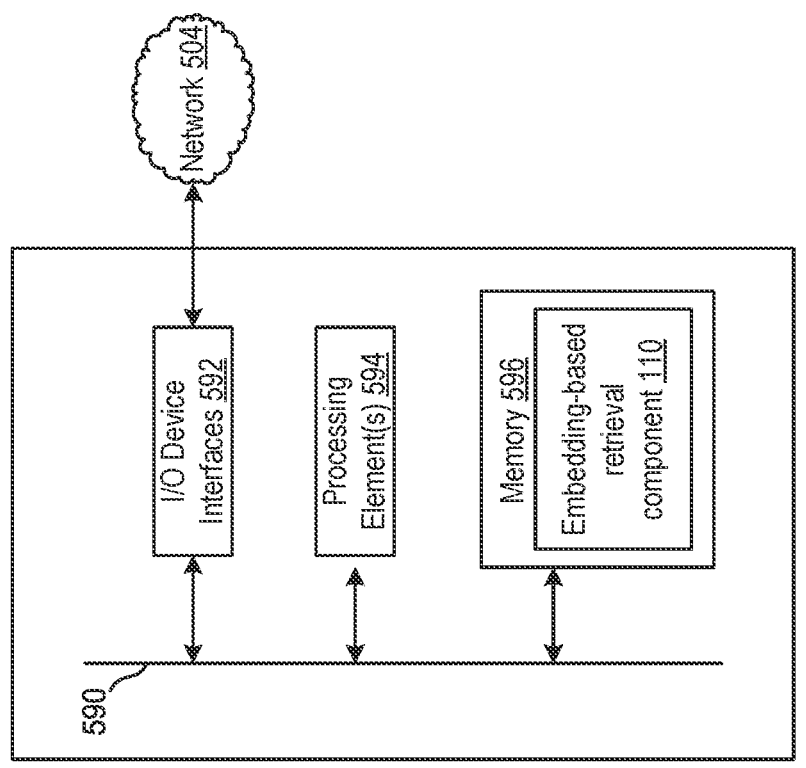
FIG. 5 is a block diagram showing an example architecture of a computing device that may be used in accordance with various embodiments described herein.

FIG. 5 is a block diagram conceptually illustrating example components of a remote device, such as a computing device executing a particular skill, a computing device executing one or more components of a speech processing system (e.g., ASR processing components, NLU processing components, applicable protocol recognition, etc.) and/or command processing. Multiple computing devices may be included in the system, such as one speech processing computing device for performing ASR processing, one speech processing computing device for performing NLU processing, one or more skill computing device(s) implementing skills, etc. In operation, each of these devices (or groups of devices) may include non-transitory computer-readable and computer-executable instructions that reside on the respective device, as will be discussed further below. The remote device of FIG. 5 may communicate with one or more other devices over a network 504 (e.g., a wide area network or local area network).

Each computing device of a speech processing system may include one or more controllers/processors 594, which may each include at least one central processing unit (CPU) for processing data and computer-readable instructions, and a memory 596 for storing data and instructions of the respective device. In at least some examples, memory 596 may store, for example, a list of N-best intents data that may be generated for particular request data. In some examples, memory 596 may store machine learning models of the NLU component 260, such as machine learned models associated with various NLU process flows (described in reference to FIG. 1A), when loaded from memory 596. In various further examples, memory 596 may be effective to store instructions effective to program controllers/processors 594 to perform the various techniques described above in reference to FIGS. 1-3B. Accordingly, in FIG. 5, embedding-based retrieval component 110 is depicted as being stored within memory 596, as an example. The memories 596 may individually include volatile random access memory (RAM), non-volatile read only memory (ROM), non-volatile magnetoresistive memory (MRAM), and/or other types of memory. Each computing device of a speech processing system (and/or a component thereof) may also include memory 596 for storing data and controller/processor-executable instructions. Each memory 596 may individually include one or more non-volatile storage types such as magnetic storage, optical storage, solid-state storage, etc. Each computing device of a speech processing system may also be connected to removable or external non-volatile memory and/or storage (such as a removable memory card, memory key drive, networked storage, etc.) through respective input/output device interfaces 592. In various examples, the feature data and/or training data used by the various machine learning models may be stored and/or cached in memory 596.

Computer instructions for operating each computing device of natural language processing system 220 may be executed by the respective device's controllers/processors 594, using the memory 596 as temporary "working" storage at runtime. A device's computer instructions may be stored in a non-transitory manner in non-volatile memory 596 (e.g., a non-transitory computer-readable memory), memory 596, or an external device(s). Alternatively, some or all of the executable instructions may be embedded in hardware or firmware on the respective device in addition to or instead of software.

Each computing device of natural language processing system 200 includes input/output device interfaces 592. A variety of components may be connected through the input/output device interfaces 592, as will be discussed further below. Additionally, each computing device of a speech processing system may include an address/data bus 590 for conveying data among components of the respective device. Each component within a computing device of a speech processing system may also be directly connected to other components in addition to (or instead of) being connected to other components across the bus 590.

As noted above, multiple devices may be employed in a single system. In such a multi-device system, each of the devices may include different components for performing different aspects of the system's processing. The multiple devices may include overlapping components. The components of a speech processing system, as described herein, are exemplary, and may be located as a stand-alone device or may be included, in whole or in part, as a component of a larger device or system.

FIG. 6 is a block diagram illustrating a device 111 (e.g., a natural language processing enabled device) and a natural language processing system 220, in accordance with embodiments of the present disclosure. In various examples, device 111 may be a natural language processing-enabled device and may include microphones (e.g., far-field microphone arrays) used to transform audio into electrical signals. The device 111 may be among the network-connected devices described herein that are local to (e.g., communicating on the same LAN) one or more other network-connected devices. Natural language processing may then be performed, either locally by the natural language processing components of device 111, by one or more other computing devices communicating with the device 111 over a network (e.g., natural language processing system 220), or by some combination of the device 111 and the one or more other computing devices. In various examples, device 111 may include and/or may be configured in communication with output device(s) 610 (e.g., speakers, displays, and/or other network connected devices) effective to output information obtained in response to a user's spoken request or command, or to output content that may be of interest to one or more users. As used herein, a display of the device 111 refers to a display effective to output graphics such as images and/or video. Further, as used herein, a displayless device refers to a device that does not include a display that is effective to render graphical images or text.

In various examples, the device 111 may include and/or may be configured in communication with embedding-based retrieval component 110. Accordingly, the device 111 may be used to determine a list of candidate skills that are most likely to be able to service the current natural language input.

A natural language processing-enabled computing system may respond to user utterances by outputting content and/or performing one or more other actions, such as playing music, providing information, calling a taxi, displaying an image, etc. Generally, input data received by the various natural language processing systems and components described herein may comprise natural language input data. Natural language input data may be in the form of audio data representing spoken user utterances (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Speech-processing systems may be configured with multiple applications (e.g., thousands, tens of thousands, or more applications) that can be used to potentially respond to a user request. Applications may be referred to herein as "skills." Natural language processing systems may be effective to process spoken and/or textual natural language inputs to determine data representing a semantic understanding of the inputs. Skills may include any application effective to communicate with a natural language processing system in order to take one or more actions based on inputs from the natural language processing system. For example, a speech-processing system may include music skills, video skills, calendar skills, timer skills, general knowledge answering skills, game skills, device control skills, etc. As described herein, skills receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.).

The invocation of a skill by a user's utterance may include a request that an action be taken. The number of applications/skills continues to grow and the rate of growth is increasing as developers become more accustomed to application programming interfaces (APIs) and application development kits provided for the voice user interface system. Rule-based approaches and/or predefined utterance matching may be used in some systems for processing requests spoken in a certain format to invoke a particular application. In at least some examples, a "skill," "skill component," "skill," "natural language processing skill," and the like may be software running on a computing device, similar to a traditional software application running on a computing device. Such skills may include a voice user interface in addition to or instead of, in at least some instances, a graphical user interface, smart home device interface, and/or other type of interface.

In addition to using the microphone(s) 470 to capture utterances and convert them into digital audio data 211, the device 111 may additionally, or alternatively, receive audio data 211 (e.g., via the communications interface 612) from another device in the environment. In various examples, the device 111 may capture video and/or other image data using a camera. Under normal conditions, the device 111 may operate in conjunction with and/or under the control of a remote, network-based or network-accessible natural language processing system 220. The natural language processing system 220 may, in some instances, be part of a network-accessible computing platform that is maintained and accessible via a wide area network (WAN). Network-accessible computing platforms such as this may be referred to using terms such as "on-demand computing", "software as a service (SaaS)", "platform computing", "network-accessible platform", "cloud services", "data centers", and so forth. The natural language processing system 220 may be configured to provide particular functionality to large numbers of local (e.g., in-home, in-car, etc.) devices of different users. The WAN is representative of any type of public or private, wide area network, such as the Internet, which extends beyond the environment of the device 111. Thus, the WAN may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

In some embodiments, the natural language processing system 220 may be configured to receive audio data 211 from the device 111, to recognize speech in the received audio data 211, and to perform functions in response to the recognized speech. In some embodiments, these functions involve sending a command, from the natural language processing system 220, to the device 111 to cause the device 111 to perform an action, such as output an audible response to the user speech via output device 610 (e.g., one or more loudspeakers). Thus, under normal conditions, when the device 111 is able to communicate with the natural language processing system 220 over a WAN (e.g., the Internet), some or all of the functions capable of being performed by the natural language processing system 220 may be performed by sending a command over a WAN to the device 111, which, in turn, may process the command for performing actions. For example, the natural language processing system 220, via a remote command that is included in remote response data, may instruct the device 111 to output an audible response (e.g., using a local text-to-speech (TTS) synthesis component 280) to a user's question, to output content (e.g., music) via output device 610 (e.g., one or more loudspeakers) of the device 111, or to control other devices in the local environment (e.g., the user's home). It is to be appreciated that the natural language processing system 220 may be configured to provide other functions, in addition to those discussed herein, such as, without limitation, providing step-by-step directions for navigating from an origin to a destination location, conducting an electronic commerce transaction on behalf of a user as part of a shopping function, establishing a communication session between the current user and another user, etc.

In order to process voice commands locally, the device 111 may include a local voice services component 626. When a user utterance including the wakeword is captured by the microphone 470 of the device 111, the audio data 211 representing the utterance is received by a wakeword engine 624 of the voice services component 626. The wakeword engine 624 may be configured to compare the audio data 211 to stored models used to detect a wakeword (e.g., "Computer") that indicates to the device 111 that the audio data 211 is to be processed for determining an intent. Thus, the wakeword engine 624 is configured to determine whether a wakeword is detected in the audio data 211, and, if a wakeword is detected, the wakeword engine 624 can proceed with routing the audio data 211 to an audio front end (AFE) 625 (sometimes referred to as an acoustic front end (AFE)) of the voice services component 626. If a wakeword is not detected in the audio data 211, the wakeword engine 624 can refrain from sending the audio data 211 to the AFE 625, thereby preventing the audio data 211 from being further processed. The audio data 211 can be discarded.

The AFE 625 is configured to transform the audio data 211 received from the wakeword engine 624 into data for processing by a suitable ASR component and/or NLU component. The AFE 625 may reduce noise in the audio data 211 and divide the digitized audio data 211 into frames representing a time intervals for which the AFE 625 determines a number of values, called features, representing the qualities of the audio data 211, along with a set of those values, called a feature vector, representing the features/qualities of the audio data 211 within the frame. Many different features may be determined, and each feature represents some quality of the audio data 211 that may be useful for ASR processing and/or NLU processing. A number of approaches may be used by the AFE 625 to process the audio data 211, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some embodiments, the AFE 625 is configured to use beamforming data to process the received audio data 211. Beamforming can be used to distinguish between the directions from which speech and noise originate. Accordingly, the microphones 470 may be arranged in a beamforming array to receive multiple audio signals, where multiple audio sources including speech may be identified in different beams and processed. Beamforming may involve processing multiple audio signals (e.g., originating from multiple microphones in a microphone array) together, such as by time shifting one audio signal with respect to another audio signal, to increase the signal and decrease the noise in the audio. Time offsets in the audio data 211, used by the AFE 625 in beamforming, may be determined based on results of the wakeword engine 624's processing of the audio data 211. For example, the wakeword engine 624 may detect the wakeword in the audio data 211 from a first microphone 470 at time, r, while detecting the wakeword in the audio data 211 from a second microphone 470 a millisecond later in time (e.g., time, 1+1 millisecond), and so on and so forth, for any suitable number of audio signals corresponding to multiple microphones 470 in a microphone array.

A speech interaction manager (SIM) 628 of the voice services component 626 may receive the audio data 211 that has been processed by the AFE 625. The SIM 628 may manage received audio data 211 by processing request data and non-speech noise or sounds as events, and the SIM 628 may also manage the processing of commands that are used to respond to the user speech or non-speech noise or sounds (e.g., by controlling the action(s) of natural language processing components of device 111). The SIM 628 may include one or more client applications 630 for performing various functions at the device 111.

A hybrid request selector component 632 of the device 111 is shown as including a hybrid proxy component (HP) 634, among other components. The HP 634 can be implemented as a layer within the voice services component 626 that is located between the SIM 628 and a speech communication library (SCL) 636, and may be configured to proxy traffic to/from the natural language processing system 220. For example, the HP 634 may be configured to pass messages between the SIM 628 and the SCL 636 (such as by passing events and instructions there between), and to send messages to/from a hybrid execution controller component (HEC) 638 of the hybrid request selector component 632. For instance, command data received from the natural language processing system 220 can be sent to the HEC 638 using the HP 634, which sits in the path between the SCL 636 and the SIM 628. The HP 634 may also be configured to allow audio data 211 received from the SIM 628 to pass through to the natural language processing system 220 (via the SCL 636) while also receiving (e.g., intercepting) this audio data 211 and sending the received audio data 211 to the HEC 638 (sometimes via an additional SCL).

As will be described in more detail below, the HP 634 and the HEC 638 are configured to perform a handshake procedure to connect to each other. As part of this handshake procedure, the HP 634 and the HEC 638 exchange data including, without limitation, configurations, context, settings, device identifiers (ID), networking protocol versions, time zones, and language data (sometimes referred to herein as "locale data"). Based on at least some of this data (e.g., based at least in part on the language data) exchanged during the handshake procedure, the HEC 638 determines whether to accept or reject the connection request from the HP 634. If the HEC 638 rejects the HP's 634 connection request, the HEC 638 can provide metadata to the HP 634 that provides a reason why the connection request was rejected.

A local natural language processing component 240' (sometimes referred to as a "natural language processing component," a "spoken language understanding (SLU) component," a "speech engine," or an "engine") is configured to process audio data 211 (e.g., audio data 211 representing user speech, audio data 211 representing non-speech noise or sounds, etc.). In some embodiments, the hybrid request selector component 632 may further include a local request orchestrator component (LRO) 642. The LRO 642 is configured to notify the local natural language processing component 240' about the availability of new audio data 211 that represents user speech, and to otherwise initiate the operations of the local natural language processing component 240' when new audio data 211 becomes available. In general, the hybrid request selector component 632 may control the execution of the local natural language processing component 240', such as by sending "execute" and "terminate" events/instructions to the local natural language processing component 240'. An "execute" event may instruct the local natural language processing component 240' to continue any suspended execution based on audio data 211 (e.g., by instructing the local natural language processing component 240' to execute on a previously-determined intent in order to generate a command). Meanwhile, a "terminate" event may instruct the local natural language processing component 240' to terminate further execution based on the audio data 211, such as when the device 111 receives command data from the natural language processing system 220 and chooses to use that remotely-generated command data.

The LRO 642 may interact with a skills execution component 644 that is configured to receive intent data output from the local natural language processing component 240' and to execute a skill based on the intent.

To illustrate how the device 111 can operate at runtime, consider an example where a user utters an expression, such as "Computer, turn off the kitchen lights." The audio data 211 is received by the wakeword engine 624, which detects the wakeword "Computer," and forwards the audio data 211 to the SIM 628 via the AFE 625 as a result of detecting the wakeword. The SIM 628 may send the audio data 211 to the HP 634, and the HP 634 may allow the audio data 211 to pass through to the natural language processing system 220 (e.g., via the SCL 636), and the HP 634 may also input the audio data 211 to the local natural language processing component 240' by routing the audio data 211 through the HEC 638 of the hybrid request selector 632, whereby the LRO 642 notifies the local natural language processing component 240' of the incoming audio data 211. At this point, the hybrid request selector 632 may wait for response data from the natural language processing system 220 and/or the local natural language processing component 240'.

The local natural language processing component 240' is configured to receive the audio data 211 from the hybrid request selector 632 as input, to recognize speech (and/or non-speech audio events) in the audio data 211, to determine an intent (e.g., user intent) from the recognized speech (or non-speech audio event). This intent can be provided to the skills execution component 644 via the LRO 642, and the skills execution component 644 can determine how to act on the intent by generating directive data. In some cases, a directive may include a description of the intent (e.g., an intent to turn off {device A}). In some cases, a directive may include (e.g., encode) an identifier of a second device, such as the kitchen lights, and an operation to be performed at the second device. Directive data that is generated by the skills execution component 644 (and/or the natural language processing system 220) may be formatted using Java, such as JavaScript syntax, or JavaScript-based syntax. This may include formatting the directive using JSON. In some embodiments, a locally-generated directive may be serialized, much like how remotely-generated directives are serialized for transmission in data packets over the network. In other embodiments, a locally-generated directive is formatted as a programmatic API call with a same logical operation as a remotely-generated directive. In other words, a locally-generated directive may mimic remotely-generated directives by using a same, or a similar, format as the remotely-generated directive.

The local natural language processing component 240' may include an automatic speech recognition (ASR) component 250' that is configured to perform ASR processing on the audio data 211 to convert the audio data 211 into text data (sometimes referred to herein as "ASR text data," an "ASR result", or "ASR data"). ASR transcribes audio data 211 into text data representing the words of the user speech contained in the audio data 211. A spoken utterance in the audio data 211 can be input to the local ASR component 250', which then interprets the utterance based on the similarity between the utterance and pre-established language models available to the local natural language processing component 240'. In some embodiments, the local ASR component 250' outputs the most likely text recognized in the audio data 211, or multiple hypotheses in the form of a lattice or an N-best list with individual hypotheses corresponding to confidence scores or other scores (such as probability scores, etc.). In some embodiments, the local ASR component 250' is customized to the user (or multiple users) who created a user account to which the device 111 is registered. For instance, the language models (and other data) used by the local ASR component 250' may be based on known information (e.g., preferences) of the user, and/or on a history of previous interactions with the user.

The local natural language processing component 240' may also include a local NLU component 260' that performs NLU processing on the generated ASR text data to determine intent data and/or slot data (referred to herein as a "NLU result", or "NLU data") so that directives may be determined (e.g., by the skills execution component 644) based on the intent data and/or the slot data. Generally, the local NLU component 260' takes textual input (such as text data generated by the local ASR component 250') and attempts to make a semantic interpretation of the ASR text data.

Natural Language Processing System

In other situations, the device 111 may send the audio data 211 to the natural language processing system 220 for processing. As described above, the device 111 may capture audio using the microphone 470, and send audio data 211 (e.g., representing a spoken user request), corresponding to the captured audio, to the natural language processing system 220. The device 111 may include a wakeword detection component that detects when input audio includes a spoken wakeword, and when the wakeword is detected, the audio data 211 is sent by the device 111 to the natural language processing system 220.

Upon receipt by the natural language processing system 220, the audio data 211 may be sent to an orchestrator 230. The orchestrator 230 may include memory and logic that enables the orchestrator 230 to send various pieces and forms of data to various components of the system.

Similar to the operation described above with respect to the local natural language processing component 240' of the device 111, the orchestrator 230 may send the audio data 211 to a natural language processing component 240. An ASR component 250 of the natural language processing component 240 transcribes the audio data 211 into one or more hypotheses representing speech contained in the audio data 211. The natural language processing component 240 interprets the speech in the audio data based on a similarity between the characteristics of the audio data corresponding to the speech and pre-established language models. For example, the natural language processing component 240 may compare the audio data 211 with models for sounds (e.g., subword units such as phonemes) and sequences of sounds to identify words that match the sequence of sounds in the speech represented in the audio data 211. The natural language processing component 240 may send text data generated thereby to an NLU component 260 of the natural language processing component 240. The text data output by the natural language processing component 240 may include a top scoring hypothesis of the speech represented in the audio data 211 or may include an N-best list including a group of hypotheses of the speech represented in the audio data 211, and potentially respective scores ASR processing confidence scores.

The NLU component 260 attempts to make a semantic interpretation of the phrases or statements represented in the text data input therein. That is, the NLU component 260 determines one or more meanings associated with the phrases or statements represented in the text data based on individual words represented in the text data. The NLU component 260 interprets a text string to derive an intent of the user (e.g., an action that the user desires be performed) as well as pertinent pieces of information in the text data that allow a device (e.g., the natural language processing system 220) to complete the intent. For example, if the text data corresponds to "Play the new album by {Musical_Artist}", the NLU component 260 may determine the user intended to invoke a music playback intent to play the identified album.

The natural language processing system 220 may include a non-transitory computer-readable memory storage 270, storing various instructions for operation of the natural language processing system 220. As previously described, in some examples, the embedding-based retrieval component 110 may be instantiated as a part of the natural language processing system 220 and/or as a separate component configured in communication with the natural language processing system 220.

As described above, the natural language processing system 220 may include one or more skills 290. The natural language processing system 220 may also include a TTS component 280 that synthesizes speech (e.g., generates audio data) corresponding to text data input therein. The TTS component 280 may perform speech synthesis using one or more different methods. In one method of synthesis called unit selection, the TTS component 280 matches text data against one or more databases of recorded speech. Matching units are selected and concatenated together to form audio data. In another method of synthesis called parametric synthesis, the TTS component 280 varies parameters such as frequency, volume, and noise to create an artificial speech waveform output. Parametric synthesis uses a computerized voice generator, sometimes called a vocoder.

The various components of the natural language processing system 220 and the device 111 described herein may be implemented in software, hardware, firmware, or some combination thereof.

The natural language processing system 220 may reside on device 111, in a cloud computing environment, or some combination thereof. For example, the device 111 may include computing equipment, some portion of which is configured with some or all of the components or functionality of natural language processing system 220 and another portion of which is configured with some or all of the components or functionality of computing device(s) used in natural language processing system 220. The device 111 may then perform a variety of functions on its own (such as when remote communications are unavailable), and/or may communicate (when capable) with computing device(s) and/or the natural language processing system 220 to perform other functions. Alternatively, all of the functionality may reside on the device 111 or remotely.

Figure 7:
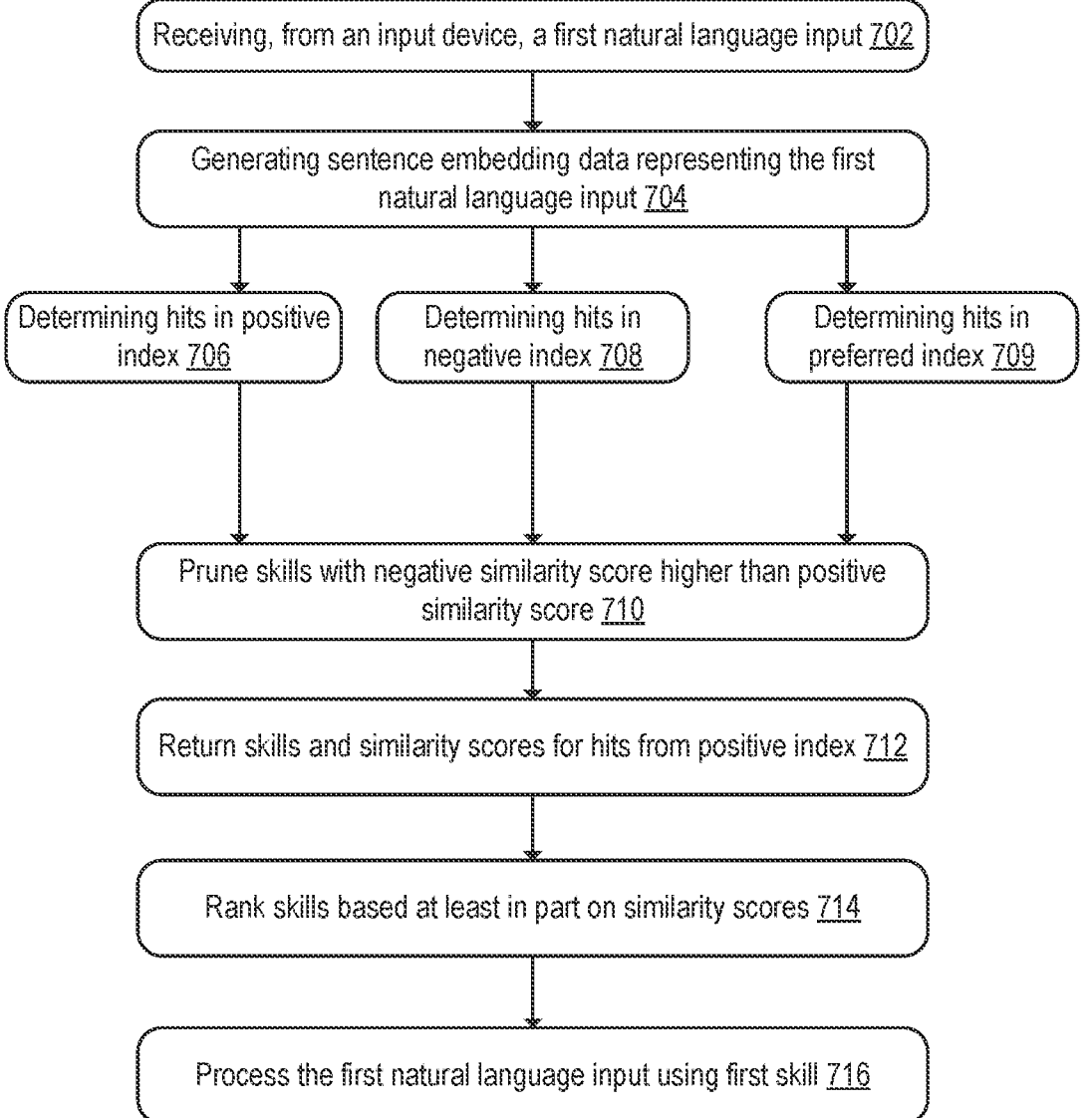
FIG. 7 is a flow diagram illustrating an example process for natural language processing skill candidate determination, in accordance with various aspects of the present disclosure.

FIG. 7 is a flow diagram illustrating an example process 700 for natural language processing skill candidate determination, according to various techniques described herein. The process 700 of FIG. 7 may be executed by one or more computing devices. The actions of process 700 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 700 may be described above with reference to elements of FIGS. 1-6. Although shown in a particular order, the steps of process 700 may instead be performed in a different order. Additionally, various steps may be performed in parallel in various implementations. Further, some steps may be omitted and/or other steps may be added in accordance with the network anomaly detection techniques described herein.

Process 700 may begin at action 702, at which a first natural language input may be received from an input device. For example, a user may issue a spoken and/or text request to an input device including a voice and/or a text input interface. In various examples, the input device may be associated with a particular account (e.g., an account of the user and/or an account for which the device was registered). For example, the device may be registered to a business on which premises the device is located.

Processing may continue at action 704 at which sentence embedding data representing the first natural language input may be generated. For example, a transformer sentence embedding model may be used to embed the natural language input. If the natural language input was a spoken request, ASR processing may first be performed to generate text or other ASR output prior to inputting the text or other ASR output into the sentence embedding model. The sentence embedding model may be the same model used to populate the various indices (e.g., positive index 30, negative index 32, and/or preferred index 34) described herein.

Processing may continue at action 706 at which hits may be determined based on similarity between the embedding data representing the natural languagage input data and the various embedding data stored in the positive index 30. In various examples, a nearest neighbor algorithm and/or other dense vector search algorithm may be used to determined the top k results in the index, based on a similarity metric used to compare the input embedding data to the embedding data stored in the index. For example, an approximate nearest neighbor algorithm may be used to search the positive index 30 to alleviate latency concerns due to the size of the search space. However, in other examples, KNN and/or another dense vector search may be used. In various examples, pre-filtering may be performed based on contextual data retrieved using the device identifier data. For example, if the device is associated with a particular entity, a pre-filtering operation may be performed such that only skills associated with that entity are considered when determining the hits. As previously described, the hits may be determined by the nearest neighbor algorithm using a similarity metric such as cosine similarity and/or Euclidean distance to determine a similarity between the input embedding data and the embedding data stored in the index. Hits may be those embeddings with similarity scores (e.g., cosine similarity scores or other similarity scores generated using the selected embedding-comparison metric) above a threshold score. In many cases, embedding data stored in the positive index may be associated with skill identifier data identifying a skill for which the utterance has been designated a positive utterance. It should be noted, that similarity scores being "above" a threshold are just one example of "satisfying" the threshold. In some other examples, being "below" the threshold may satisfy it, depending on the implementation and depending on whether high similarity scores or low similarity scores indicate a higher degree of similarity between the data being compared.

Processing may continue at action 708 at which hits may be determined between the embedding data representing the natural language input data and the various embedding data stored in the negative index 32. In various examples, actions 706 and 708 may occur in parallel, while in other cases, these actions may be executed in a sequence. In various examples, a nearest neighbor algorithm and/or other dense vector search algorithm may be used to determined the top k hits in the index. For example, an approximate nearest neighbor algorithm may be used to search the negative index 32 to alleviate latency concerns due to the size of the search space. However, in other examples, KNN and/or another dense vector search may be used. In various examples, pre-filtering may be performed based on contextual data retrieved using the device identifier data. For example, if the device is associated with a particular entity, a pre-filtering operation may be performed such that only skills associated with that entity are considered when determining the hits. As previously described, the hits may be determined by the nearest neighbor algorithm using a similarity metric such as cosine similarity and/or Euclidean distance to determine a similarity between the input embedding data and the embedding data stored in the index. Hits may be those embeddings with similarity scores (e.g., cosine similarity scores) above a threshold score. In some examples, different threshold values may be used between the positive index 30 and the negative index 32. In many cases, embedding data stored in the negative index 32 may be associated with skill identifier data identifying a skill for which the utterance has been designated as a negative utterance. It should be noted, that similarity scores being "above" a threshold are just one example of "satisfying" the threshold. In some other examples, being "below" the threshold may satisfy it, depending on the implementation and depending on whether high similarity scores or low similarity scores indicate a higher degree of similarity between the data being compared.

Processing may continue at action 709 at which hits may be determined between the embedding data representing the natural language input data and the various embedding data stored in the preferred index 34. In various examples, actions 706, 708, and 709 may occur in parallel, while in other cases, these actions may be executed in a sequence. In various examples, a nearest neighbor algorithm and/or other dense vector search algorithm may be used to determined the top k hits in the index. For example, KNN and/or another nearest neighbor technique may be used. Hits may be those embeddings with similarity scores (e.g., cosine similarity scores) above a threshold score. In some examples, different threshold values may be used between the positive index 30, the negative index 32, and the preferred index 34. In many cases, embedding data stored in the preferred index 34 may represent targeted utterances for a particular skill and/or for a particular group of skills (e.g., all skills associated with a particular entity and/or domain). It should be noted, that similarity scores being "above" a threshold are just one example of "satisfying" the threshold. In some other examples, being "below" the threshold may satisfy it, depending on the implementation and depending on whether high similarity scores or low similarity scores indicate a higher degree of similarity between the data being compared.

In some examples, the hits from the preferred index 34 may be given precedence over the hits returned from the positive index 30. For example, positive index 30 hits may be pruned if a hit from the preferred index 34 exists. In other examples, a priority signal may be included with the hits from the preferred index 34. The priority signal may be used by the ranking component 120 when ranking the candidate skills for processing the natural language input.

Processing may continue at action 710, at which skills with negative similarity scores higher than their positive similarity scores may be pruned from the hits. For example, Skill A may have a hit in the positive index 30 with a similarity score of 1.7 for a positive utterance. Skill A may also have a hit in the negative index 32 with a similarity score of 1.8 for a negative utterance. Skill A may be pruned from the set of candidate skills sent for further routing processing since the similarity score for the positive hit similarity score is lower than the negative hit similarity score.

Processing may continue at action 712, at which skills and similarity scores may be returned for hits from the positive index. The embedding-based retrieval component 110 may output the remaining hits from the positive index 30 (after pruning hits with higher negative similarity scores). The output may identify the skills with positive hits and may also include their similarity scores. The similarity scores may be used by various downstream routing processes (e.g., by machine learning models of ranking component 120). Processing may continue at action 714, at which the candidate skills may be ranked based at least in part on the similarity scores. For example, the similarity scores may be used as an input signal to a ranking machine learning model.

At action 716, a first skill may be selected (e.g., by ranking component 120 and/or decider component 132) for processing the first natural language input. Accordingly, the intent data and/or slot data representing the first natural language input may be sent to the first skill for processing.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s).

The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method comprising:
receiving, from an input device, a first natural language input;
generating, using a pre-trained transformer model, sentence embedding data representing the first natural language input;
generating, by searching a positive search index using a nearest neighbor algorithm, a first similarity score representing similarity between the sentence embedding data and first embedding data stored in the positive search index, the first embedding data representing a first utterance to which a first application is able to respond;
generating, by searching the positive search index using the nearest neighbor algorithm, a second similarity score representing similarity between the sentence embedding data and second embedding data stored in the positive search index, the second embedding data representing a second utterance to which a second application is able to respond;
generating, by searching a negative search index using the nearest neighbor algorithm, a third similarity score representing similarity between the sentence embedding data and third embedding data stored in the negative search index, wherein the negative search index comprises embedding data associated with respective utterances that have been specified as utterances to which the first application is unable to respond;
determining, using the first similarity score and the second similarity score, that the sentence embedding data is more similar to the first embedding data than the second embedding data;
determining, using the third similarity score and the first similarity score, that the sentence embedding data is more similar to the third embedding data than the first embedding data;
determining a set of candidate applications for processing the first natural language input, wherein the first application is excluded from the set of candidate applications based on the sentence embedding data being more similar to the third embedding data than the first embedding data;
generating first data indicating that the second application is a first candidate of a set of candidate applications for processing the first natural language input;
determining the second application for processing the first natural language input from among the set of candidate applications based on the first data; and
sending data representing the first natural language input to the second application, wherein the second application is effective to perform a first action in response to the first natural language input.

2. The method of claim 1, further comprising:
determining, using the nearest neighbor algorithm, a fourth similarity score representing a similarity between the sentence embedding data and fourth embedding data, the fourth embedding data representing a fourth utterance specified as a first preferred utterance for invoking a third application; and
generating second data indicating that the third application is a second candidate for processing the first natural language input.

3. The method of claim 1, further comprising:
determining first identifier data associated with the input device;
determining a first set of applications associated with the first identifier data; and
sending a command to the nearest neighbor algorithm effective to limit entries of a first data store to entries corresponding to applications of the first set of applications, wherein the first application and the second application are among the first set of applications, the first data store comprising the first embedding data and the second embedding data.

4. A method comprising:

receiving, from an input device, first natural language data;

generating first embedding data representing the first natural language data;

generating, based at least in part on searching a first search index using a nearest neighbor algorithm, first data representing similarity between the first embedding data and second embedding data stored in the first search index, the second embedding data representing second natural language data to which a first application is able to respond;

generating, based at least in part on searching the first search index using the nearest neighbor algorithm, second data representing similarity between the first embedding data and third embedding data stored in the first search index, the third embedding data representing third natural language data to which a second application is able to respond;

generating, based at least in part on searching a second search index using the nearest neighbor algorithm, third data representing similarity between the first embedding data and fourth embedding data stored in the second search index, wherein the second search index is associated with natural language inputs to which the first application is unable to respond;

generating first output data indicating that the first application and the second application are candidates for processing the first natural language data;

sending request data representing the first natural language data to the first application based at least in part on the first data and the third data, wherein the first application is effective to determine an action based at least in part on the request data; and receiving, from the first application, first response data generated in response to the first application receiving the request data.

5. The method of claim 4, further comprising:

generating, based at least in part on searching the first search index using the nearest neighbor algorithm, fourth data representing similarity between the first embedding data and a fifth embedding data representing fifth natural language data to which a third application is able to respond;

generating, based at least in part on searching the second search index using the nearest neighbor algorithm, fifth data representing similarity between the first embedding data and a fifth embedding data representing sixth natural language data to which the third application is unable to respond; and determining, based at least in part on the fourth data and the fifth data, that the third application is to be excluded from the candidates.

6. The method of claim 4, further comprising:

generating, based at least in part on searching the first search index using the nearest neighbor algorithm, fourth data representing similarity between the first embedding data and fifth embedding data, the fifth embedding data representing fifth natural language data associated with a third application;

generating, by searching the first search index using the nearest neighbor algorithm, fifth data representing similarity between the first embedding data and sixth embedding data, the sixth embedding data representing sixth natural language data associated with the third application, wherein the sixth natural language data is specified as a natural language input to which the third application is unable to respond; and generating, based at least in part on the fourth data and the fifth data, second output data indicating that the third application is a candidate for processing the first natural language data.

7. The method of claim 4, further comprising:

determining first identifier data associated with the input device;

determining a first set of applications associated with the first identifier data; and sending a command to the nearest neighbor algorithm effective to limit consideration of entries of a first data structure to entries corresponding to the first set of applications, wherein the first application and the second application are among the first set of applications, and wherein the second embedding data and the third embedding data are stored in the first data structure.

8. The method of claim 4, further comprising:

determining first identifier data associated with the input device;

determining that the first identifier data is associated with a third application;

determining, using a second nearest neighbor algorithm associated with the first identifier data, fourth data representing similarity between the first embedding data and fourth embedding data; and generating second output data indicating that the third application is a candidate for processing the first natural language data.

9. The method of claim 4, further comprising:

determining, using the nearest neighbor algorithm, fourth data representing similarity between the first embedding data and fourth embedding data, the fourth embedding data representing fourth natural language data that is designated as a target utterance associated with the first application;

determining, based at least in part on the first data and the fourth data, that a greater degree of similarity exists between the first natural language data and the fourth natural language data than between the first natural language data and the second natural language data; and generating second output data comprising the fourth data, wherein the fourth data is used by a machine learning model to rank applications for processing the first natural language data.

10. The method of claim 4, further comprising:

generating the second embedding data at least in part by determining a first sample utterance comprising first slot data and second slot data;

determining a first set of slot values representing valid values for the first slot data;

determining a second set of slot values representing valid values for the second slot data;

determining a first embedding value for a first slot value of the first set of slot values; and determining an average embedding value for the second set of slot values, wherein the second embedding data comprises the first embedding value and the average embedding value.

11. The method of claim 4, further comprising:

determining, using at least one of the nearest neighbor algorithm or a second nearest neighbor algorithm, fourth data representing similarity between the first embedding data and fourth embedding data stored associated with a target utterance for a third application;

determining, based at least in part on the fourth data and the second data that a greater degree of similarity exists between the first natural language data and the target utterance than between the first natural language data and the second natural language data; and generating second output data comprising the first data and the fourth data.

12. A system comprising:

at least one processor; and non-transitory computer-readable memory storing instructions that, when executed by the at least one processor, are effective to:

receive, from an input device, first natural language data;

generate first embedding data representing the first natural language data;

generate, based at least in part on searching a first search index using a nearest neighbor algorithm, first data representing similarity between the first embedding data and second embedding data stored in the first search index, the second embedding data representing second natural language data to which a first application is able to respond;

generate, based at least in part on searching the first search index using the nearest neighbor algorithm, second data representing similarity between the first embedding data and third embedding data stored in the first search index, the third embedding data representing third natural language data to which a second application is able to respond;

generate, based at least in part on searching a second search index using the nearest neighbor algorithm, third data representing similarity between the first embedding data and fourth embedding data stored in the second search index, wherein the second search index comprises embeddings representing natural language inputs to which the first application is unable to respond;

generate first output data indicating that the first application and the second application are candidates for processing the first natural language data;

send request data representing the first natural language data to the first application, based on the first data and the third data, wherein the first application is effective to determine an action based at least in part on the request data representing the first natural language data; and receive, from the first application, first response data generated in response to the first application receiving the request data.

13. The system of claim 12, the non-transitory computer-readable memory storing further instructions that, when executed by the at least one processor, are further effective to:

generate, based at least in part on searching the first search index using the nearest neighbor algorithm, fourth data representing similarity between the first embedding data and a fifth embedding data representing fifth natural language data to which a third application is able to respond;

generate, based at least in part on searching the second search index using the nearest neighbor algorithm, fifth data representing similarity between the first embedding data and a fifth embedding data representing sixth natural language data to which the third application is unable to respond; and determine, based at least in part on the fourth data and the fifth data, that the third application is to be excluded from the candidates.

14. The system of claim 12, the non-transitory computer-readable memory storing further instructions that, when executed by the at least one processor, are further effective to:

generate, based at least in part on searching the first search index using the nearest neighbor algorithm, fourth data representing similarity between the first embedding data and fifth embedding data, the fifth embedding data representing fifth natural language data associated with a third application;

generate, based at least in part on searching the second search index using the nearest neighbor algorithm, fifth data representing similarity between the first embedding data and sixth embedding data, the sixth embedding data representing sixth natural language data associated with the third application, wherein the sixth natural language data is specified as a natural language input to which the third application is unable to respond; and generate, based at least in part on the fourth data and the fifth data, second output data indicating that the third application is a candidate for processing the first natural language data.

15. The system of claim 12, the non-transitory computer-readable memory storing further instructions that, when executed by the at least one processor, are further effective to:

determine first identifier data associated with the input device;

determine a first set of applications associated with the first identifier data; and send a command to the nearest neighbor algorithm effective to limit consideration of entries of a first data structure to entries corresponding to the first set of applications, wherein the first application and the second application are among the first set of applications, and wherein the second embedding data and the third embedding data are stored in the first data structure.

16. The system of claim 12, the non-transitory computer-readable memory storing further instructions that, when executed by the at least one processor, are further effective to:

determine first identifier data associated with the input device;

determine that the first identifier data is associated with a third application;

determine, using a second nearest neighbor algorithm associated with the first identifier data, fourth data representing similarity between the first embedding data and fourth embedding data; and generate second output data indicating that the third application is a candidate for processing the first natural language data.

17. The system of claim 12, the non-transitory computer-readable memory storing further instructions that, when executed by the at least one processor, are further effective to:

determine, using the nearest neighbor algorithm, fourth data representing similarity between the first embedding data and fourth embedding data, the fourth embedding data representing fourth natural language data that is designated as a target utterance associated with the first application;

determine, based at least in part on the first data and the fourth data, that a greater degree of similarity exists between the first natural language data and the fourth natural language data than between the first natural language data and the second natural language data; and generate second output data comprising the fourth data, wherein the third data is used by a machine learning model to rank applications for processing the first natural language data.

18. The system of claim 12, the non-transitory computer-readable memory storing further instructions that, when executed by the at least one processor, are further effective to:

generate the second embedding data at least in part by determining a first sample utterance comprising first slot data and second slot data;

determine a first set of slot values representing valid values for the first slot data;

determine a second set of slot values representing valid values for the second slot data;

determine a first embedding value for a first slot value of the first set of slot values; and determine an average embedding value for the second set of slot values, wherein the second embedding data comprises the first embedding value and the average embedding value.

* * * * *